(12) United States Patent
Wu et al.

(10) Patent No.: US 10,158,102 B2
(45) Date of Patent: Dec. 18, 2018

(54) PORTABLE ELECTRICAL ENERGY STORAGE DEVICE WITH THERMAL RUNAWAY MITIGATION

(71) Applicant: Gogoro Inc., Hong Kong (CN)

(72) Inventors: Yi-Tsung Wu, New Taipei (TW); Hok-Sum Horace Luke, Mercer Island, WA (US); Chia Nung Wu, Kaohsiung (TW); Matthew Whiting Taylor, North Bend, WA (US)

(73) Assignee: Gogoro Inc., Hong Kong (CN)

( * ) Notice: Subject to any disclaimer, the term of this patent is extended or adjusted under 35 U.S.C. 154(b) by 712 days.

(21) Appl. No.: 14/472,702

(22) Filed: Aug. 29, 2014

(65) Prior Publication Data

US 2015/0064514 A1    Mar. 5, 2015

Related U.S. Application Data

(60) Provisional application No. 61/872,126, filed on Aug. 30, 2013.

(51) Int. Cl.
*H01M 2/02* (2006.01)
*H01M 2/12* (2006.01)
(Continued)

(52) U.S. Cl.
CPC ......... *H01M 2/024* (2013.01); *H01M 2/1016* (2013.01); *H01M 2/1241* (2013.01); *H01M 10/658* (2015.04); *H01M 10/0445* (2013.01); *H01M 10/0525* (2013.01); *H01M 10/6569* (2015.04); *Y02E 60/122* (2013.01)

(58) Field of Classification Search
CPC ........................................ H01M 2/12–2/1294
See application file for complete search history.

(56) References Cited

U.S. PATENT DOCUMENTS

| D221,081 S | 7/1971 | Kahn |
| D227,773 S | 7/1973 | Dafler et al. |
| (Continued) |

FOREIGN PATENT DOCUMENTS

| CA | 2 865 976 A1 | 9/2013 |
| CN | 101527352 | 9/2009 |
| (Continued) |

OTHER PUBLICATIONS

International Search Report and Written Opinion, dated Jul. 28, 2016, for corresponding International Application No. PCT/US2016/019910, 11 pages.

(Continued)

*Primary Examiner* — Eric R Smith
(74) *Attorney, Agent, or Firm* — Perkins Coie LLP

(57) ABSTRACT

Electrical energy storage device for powering portable devices such as vehicles or consumer electronics includes barriers to minimize migration of thermal energy and propagation of combustion in the rare event that electrical energy storage cells fail, burst and ignite. A burst structure is provided to vent gas from the device in a desired direction in the event pressure within the device exceeds a maximum value. Biased vents permit gases emanating from a portable electrical energy storage cell within an electrical energy storage module to escape and isolate other electrical energy storage cells from the gases.

17 Claims, 11 Drawing Sheets

(51) Int. Cl.
*H01M 10/658* (2014.01)
*H01M 10/04* (2006.01)
*H01M 10/052* (2010.01)
*H01M 10/656* (2014.01)
*H01M 10/10* (2006.01)
*H01M 2/10* (2006.01)
*H01M 10/0525* (2010.01)
*H01M 10/6569* (2014.01)

(56) References Cited

U.S. PATENT DOCUMENTS

| | | | |
|---|---|---|---|
| 5,585,204 A * | 12/1996 | Oshida | H01M 10/443 429/120 |
| 5,866,276 A | 2/1999 | Ogami et al. | |
| 5,976,728 A * | 11/1999 | Yamamoto | H01M 2/1229 429/54 |
| 6,204,635 B1 * | 3/2001 | Sullivan | H01M 2/0426 320/134 |
| D472,209 S | 3/2003 | Wada et al. | |
| D472,210 S | 3/2003 | Tada et al. | |
| D476,294 S | 6/2003 | Tada et al. | |
| D476,620 S | 7/2003 | Tada et al. | |
| D573,948 S | 7/2008 | Itagaki et al. | |
| 7,433,794 B1 | 10/2008 | Berdichevsky et al. | |
| D582,416 S | 12/2008 | Duarte et al. | |
| D588,537 S | 3/2009 | Allen | |
| D603,792 S | 11/2009 | Ferro | |
| 7,749,650 B1 | 7/2010 | Hermann | |
| 7,993,155 B2 | 8/2011 | Heichal et al. | |
| 8,006,793 B2 | 8/2011 | Heichal et al. | |
| 8,013,571 B2 | 9/2011 | Agassi et al. | |
| 8,114,540 B2 | 2/2012 | Trester et al. | |
| 8,286,743 B2 | 10/2012 | Rawlinson | |
| 8,361,642 B2 | 1/2013 | Hermann et al. | |
| 8,367,233 B2 | 2/2013 | Hermann et al. | |
| 8,481,191 B2 | 7/2013 | Hermann | |
| 8,541,126 B2 | 9/2013 | Hermann et al. | |
| D693,765 S | 11/2013 | Workman et al. | |
| 8,609,268 B2 | 12/2013 | Fuhr et al. | |
| D711,820 S | 8/2014 | Zeng | |
| D723,462 S | 3/2015 | Druker et al. | |
| D733,050 S | 6/2015 | Chiang | |
| D733,651 S | 7/2015 | Liu | |
| D738,302 S | 9/2015 | Jeong et al. | |
| 2006/0073377 A1 | 4/2006 | Al-Hallaj et al. | |
| 2008/0050637 A1 | 2/2008 | Prakash et al. | |
| 2008/0220321 A1 | 9/2008 | Yonemochi et al. | |
| 2008/0254357 A1 | 10/2008 | Liu | |
| 2009/0075163 A1 | 3/2009 | Shevock et al. | |
| 2010/0028758 A1 | 2/2010 | Eaves et al. | |
| 2010/0036085 A1 * | 2/2010 | Oh | C08G 69/12 528/391 |
| 2010/0104928 A1 | 4/2010 | Nishino et al. | |
| 2010/0104938 A1 * | 4/2010 | Hermann | H01M 2/1077 429/120 |
| 2010/0114800 A1 | 5/2010 | Yasuda et al. | |
| 2010/0183910 A1 * | 7/2010 | Nishino | H01M 10/0431 429/163 |
| 2010/0273034 A1 * | 10/2010 | Hermann | H01M 2/08 429/62 |
| 2011/0008655 A1 | 1/2011 | White et al. | |
| 2011/0091749 A1 | 4/2011 | Chow | |
| 2011/0104532 A1 * | 5/2011 | Buck | F16K 17/16 429/82 |
| 2011/0159340 A1 | 6/2011 | Hu et al. | |
| 2011/0189525 A1 | 8/2011 | Palanchon et al. | |
| 2011/0260731 A1 * | 10/2011 | Alkemade | H01M 2/12 324/426 |
| 2011/0287286 A1 * | 11/2011 | Ahn | H01M 2/1241 429/56 |
| 2012/0018116 A1 | 1/2012 | Mathur et al. | |
| 2012/0028107 A1 | 2/2012 | Sugita et al. | |
| 2012/0225331 A1 | 9/2012 | Tartaglia | |
| 2012/0244399 A1 | 9/2012 | Tartaglia | |
| 2012/0312615 A1 | 12/2012 | Rawlinson | |
| 2013/0071717 A1 | 3/2013 | Muniz | |
| 2013/0153317 A1 | 6/2013 | Rawlinson et al. | |
| 2013/0216884 A1 | 8/2013 | Takasaki et al. | |
| 2014/0023893 A1 * | 1/2014 | Shimizu | H01M 2/1077 429/72 |
| 2014/0072855 A1 | 3/2014 | Schaefer | |
| 2014/0079978 A1 | 3/2014 | Al-Hallaj et al. | |
| 2014/0368032 A1 | 12/2014 | Doerndorfer | |

FOREIGN PATENT DOCUMENTS

| | | | |
|---|---|---|---|
| CN | 102356483 | 2/2012 | |
| EP | 2 302 727 A1 | 3/2011 | |
| EP | 2 610 943 A1 | 7/2013 | |
| EP | 2 181 481 B1 | 10/2013 | |
| JP | 565054 | 8/1993 | |
| JP | 2005317456 | 11/2005 | |
| JP | 2006515104 | 5/2006 | |
| JP | 2009-21223 A | 1/2009 | |
| JP | 2012124319 | 6/2012 | |
| JP | WO 2012164982 A1 * | 12/2012 | H01M 2/1077 |
| JP | 2013037794 | 2/2013 | |
| JP | 2013-120694 A | 6/2013 | |
| WO | 2013/128007 A2 | 9/2013 | |
| WO | 2013/128009 A2 | 9/2013 | |
| WO | 2013/128009 A3 | 9/2013 | |
| WO | 2013/131548 A1 | 9/2013 | |

OTHER PUBLICATIONS

International Search Report and Written Opinion, dated Dec. 26, 2014, for corresponding International Application No. PCT/US2014/053418, 16 pages.

International Search Report and Written Opinion, dated Oct. 18, 2016, for corresponding International Application No. PCT/US2016/031653, 12 pages.

* cited by examiner

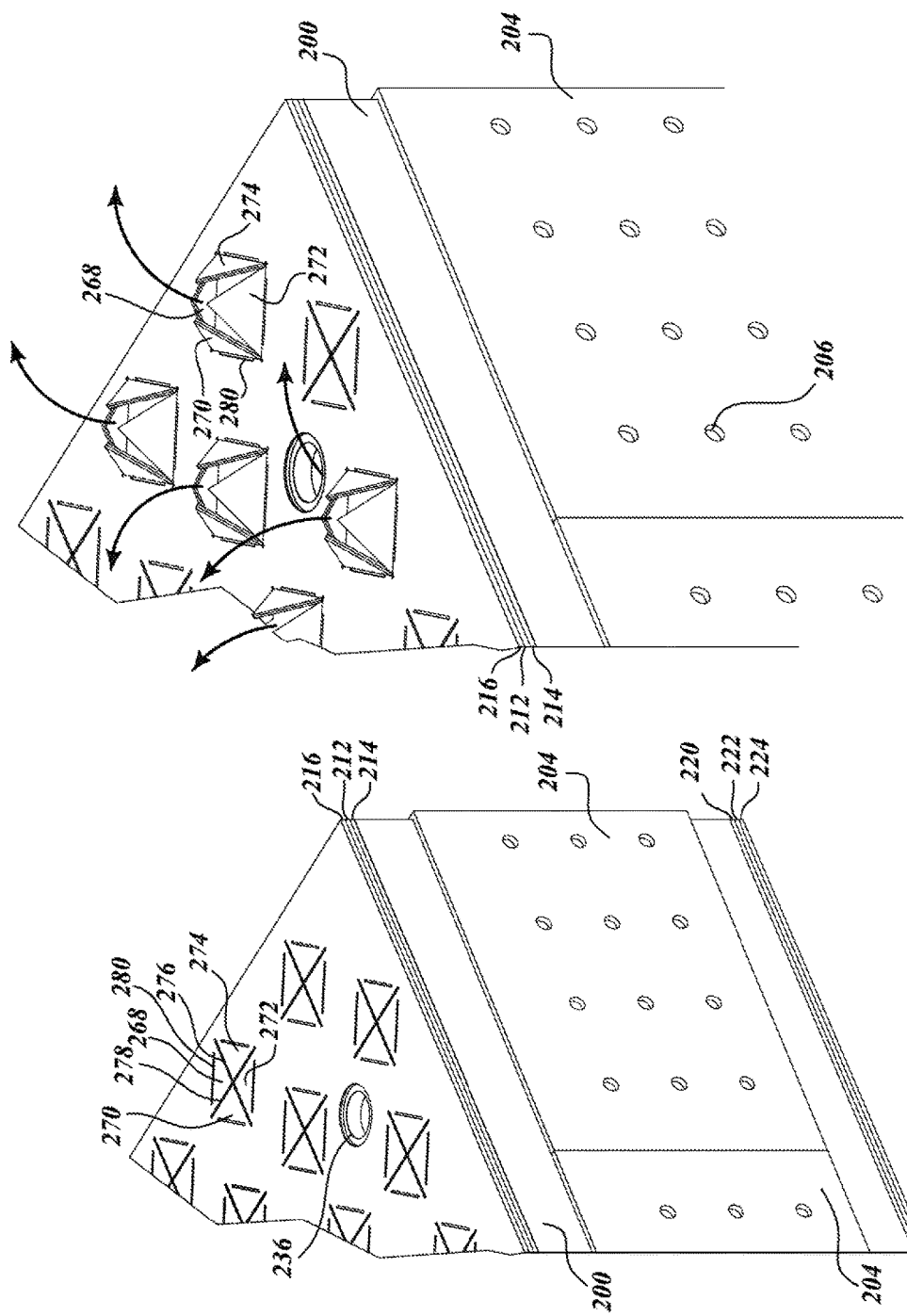

PORTABLE ELECTRICAL ENERGY STORAGE DEVICE WITH THERMAL RUNAWAY MITIGATION

BACKGROUND

Technical Field

The embodiments described herein relate to portable electrical energy storage devices, such as those used in electric powered devices such as vehicles, and consumer electronics and thermal runaway mitigation systems for such portable electrical energy storage devices.

Description of the Related Art

Batteries such as lithium-ion batteries are known for packing more energy into smaller, lighter units. Lithium-ion batteries have found wide application in powering portable electronic devices such as cell phones, tablets, laptops, power tools and other high-current equipment. The low weight and high energy density also makes lithium-ion batteries attractive for use in hybrid vehicles and fully electric-powered vehicles.

A potential shortcoming of lithium-ion batteries is their electrolyte solutions. Unlike other types of batteries, in which the electrolytes consist of aqueous solutions of acid or base, the electrolyte in lithium-ion cells typically consists of lithium salts in organic solvents such as ethylene carbonate and ethyl methyl carbonate (which can be flammable).

Under normal operation, charging a lithium-ion battery causes lithium ions in the electrolyte solution to migrate from the cathode through a thin porous polymer separator and insert themselves in the anode. Charge balancing electrons also move to the anode but travel through an external circuit in the charger. Upon discharge, the reverse process occurs, and electrons flow through the device being powered.

In very rare circumstances, internal or external short-circuiting of a lithium-ion battery can occur. For example, the electric-powered device containing the lithium-ion battery can undergo a severe impact or shock resulting in a breach in the battery, which could result in a short circuit. Due to the thin nature of the polymer separator, micrometer-sized metal particles generated during cutting, pressing, grinding, or other battery manufacturing steps can be present or find their way into the battery cell. These small metal particles can accumulate and eventually form a short circuit between the anode and the cathode. Such short circuits are to be avoided because they can result in temperatures at which the cathode may react with and decompose the electrolyte solution, generating heat and reactive gases such as hydrocarbons. Typically, at normal operating temperatures, lithium-ion batteries are very stable; however, above a certain temperature, lithium-ion battery stability becomes less predictable, and at an elevated temperature, chemical reactions within the battery case will produce gases resulting in an increase in the internal pressure within the battery case. These gases can react further with the cathode, liberating more heat and producing temperatures within or adjacent to the battery that can ignite the electrolyte in the presence of oxygen. When the electrolyte burns, small amounts of oxygen are produced, which may help fuel the combustion. At some point, build-up of pressure within the battery case results in the battery case rupturing. The escaping gas may ignite and combust. Some battery manufacturers design their cells so, in the unlikely event a cell ruptures and ignites, gases that support combustion exit the cell in predetermined locations and directions. For example, battery cells in the shape of conventional AAA or AA cells may be designed to vent from the terminal ends located at each end of the cell.

In applications where only a single lithium-ion battery is utilized, failure of a battery and the potential for combustion creates an undesirable situation. The severity of this situation is increased when a plurality of lithium-ion batteries are deployed in the form of a battery bank or module. The combustion occurring when one lithium-ion battery fails may produce local temperatures above the temperature at which other lithium-ion batteries are normally stable, causing these other batteries to fail, rupture, and vent gases which then ignite and combust. Thus, it is possible for the rupture of a single cell in a bank of lithium-ion cells to cause other cells in the bank to rupture and discharge gases which ignite and burn. Fortunately, lithium-ion batteries have proven to be very safe, and the failure and consequent rupture of a lithium-ion battery is a very rare event. Nonetheless, efforts have been made to reduce the risk of rupture and ignition of gases exiting a ruptured lithium-ion battery. For example, development of materials used for cathodes has produced lithium-based cathode materials that tolerate heat better than cathodes made from the widely used lithium cobalt oxide. While these more recently developed materials may be more heat tolerant, this benefit comes at a price. For example, lithium manganese oxide cathodes have a lower charge capacity than lithium cobalt oxide and still decompose at high temperatures. Lithium iron phosphate cathodes stand up especially well to thermal abuse; however, their operating voltage and energy density on a volume basis are lower than those of lithium cobalt oxide cathodes.

Other efforts have focused on the polymer separator and its design. For example, it has been proposed to utilize a polymer separator that sandwiches a layer of polyethylene between two layers of polypropylene in an effort to provide a degree of protection against mild overheating. As the temperature of the cell begins to approach that at which the stability of the cell becomes unpredictable, the polyethylene melts and plugs the pores in the polypropylene. When the pores of a polypropylene are plugged by the polyethylene, lithium diffusion is blocked, effectively shutting the cell down before it has a chance to ignite. Other efforts have focused on utilizing polymer separators having melting points higher than polypropylene. For example, separators made from polyimides and separators made from high molecular weight polyethylene and an embedded ceramic layer have been proposed to form a robust higher melting point polymer separator. Formulating and utilizing less flammable electrolytes and nonvolatile, nonflammable ionic liquids, fluoroethers, and other highly fluorinated solvents as battery electrolytes have also been investigated. Researchers have developed lithium-ion batteries that contain no liquids at all. These solid-state batteries contain inorganic lithium-ion conductors, which are inherently nonflammable and are thus very stable, safe, and exhibit long cycle life and shelf life. However, the manufacture of these solid-state batteries requires costly, labor-intensive vacuum deposition methods.

Despite these efforts, there continues to be a need for a portable electrical energy storage device that effectively manages the risk of electrical energy storage cell failure and combustion of gases produced as a result of such failure in multi-cell deployments, as well as propagation of failure inducing thermal energy to battery cells adjacent a failed cell, and the hazard to the user in the event of such a rare event.

BRIEF SUMMARY

Embodiments described in this application relate to portable electrical energy storage devices that include an electrical energy storage cell barrier that functions as a thermal isolator and thermal barrier to propagation of cell failure inducing thermal energy. The electrical energy storage cell barrier also includes an elastic material functioning to protect terminals of electrical energy storage cells from damage, acting as an electrical isolator and serving as a shock absorber to protect the electrical energy storage cells from damage resulting from an impact or other force.

In embodiments of one described aspect, a portable electrical energy storage device includes a first electrical energy storage cell, a second electrical energy storage cell, and an electrical energy storage cell barrier comprising a thermal insulating material and an elastic material, the electrical energy storage cell barrier located between the first electrical energy storage cell and the second electrical energy storage cell.

In embodiments of another described aspect, the first electrical energy storage cell comprises a plurality of first electrical energy storage cells.

In other embodiments, the second electrical energy storage cell comprises a plurality of second electrical energy storage cells.

In yet another embodiment, the second electrical energy storage cell is adjacent the first electrical energy storage cell.

Though not limited to the following chemistries, the first electrical energy storage cell may comprise nickel-metal hydride chemistry or lithium-ion chemistry and the second electrical energy storage cell may comprise the same chemistry as the first electrical energy storage cell.

In certain embodiments, the electrical energy storage cell barrier comprises a layer of thermal insulating material and a layer of elastic material and/or one layer of the thermal insulating material between two layers of the elastic material. In specific embodiments, the thermal insulating material has a coefficient of thermal conductivity less than about 0.5 BTU/ft$^2$/hr/inch and preferably 0.5 BTU/ft$^2$/hr/inch at temperatures where ignition of failed cells occurs. The thermal insulating material may include ceramic materials, vermiculite-based materials or other materials known to provide thermal insulating properties. The carrier for the ceramic materials may be paper-based, ceramic impregnated cloths, fiberglass or other materials capable of being formed into thin sheets containing thermal insulating materials. A specific example of a thermal insulating material is one that includes ceramic fiber, such as a ceramic fiber paper. Examples of suitable ceramic fibers include alumina, mullite, silicon carbide, zirconia or carbon.

Examples of elastic material include rubber, and more specifically, fluoropolymer rubber, butyl rubber, chlorosulfonated polyethylene rubber, epichlorohydrin rubber, ethylene propylene rubber, fluoroelastomer rubber, fluorosilicone rubber, hydrogenated nitrile rubber, natural rubber, nitrile rubber, perfluoroelastomer rubber, polyacrylic rubber, polychloroprene rubber, polyurethane rubber, silicone rubber and styrene butadiene rubber In embodiments of another described aspect, a portable electrical energy storage device includes a first electrical energy storage cell module including a plurality of electrical energy storage cells and a second electrical energy storage cell module including a plurality of electrical energy storage cells, the second electrical energy storage cell module positioned adjacent the first electrical energy storage cell module. This portable electrical energy storage device also includes a first electrical energy storage cell barrier comprising a thermal insulating material and an elastic material located between the first electrical energy storage cell module and the second electrical energy storage cell module, a second electrical energy storage cell barrier comprising a thermal insulating material and an elastic material located adjacent the second electrical energy storage cell module, and a third electrical energy storage cell barrier comprising an elastic material, the third electrical energy storage cell barrier positioned adjacent the first electrical energy storage cell module.

In certain embodiments of this described aspect, the thermal insulating material of the first electrical energy storage cell barrier is between two layers of the elastic material of the first electrical energy storage cell barrier. In yet other embodiments, the elastic material of the second electrical energy storage cell barrier is between the thermal insulating material of the second electrical energy storage cell barrier and the second electrical energy storage cell module.

In additional embodiments of this aspect, the portable electrical energy storage device includes a third electrical energy storage cell module adjacent the second electrical energy storage cell module and a fourth electrical energy storage cell barrier comprising a thermal insulating material and an elastic material positioned adjacent the third electrical energy storage cell module. In these additional embodiments, the thermal insulating material of the fourth electrical energy storage cell barrier is separated from the third electrical energy storage cell barrier by a layer of the elastic material of the fourth electrical energy storage cell barrier.

In yet other embodiments of this aspect, the portable electrical energy storage device includes a load-absorbing member contacting at least one electrical energy storage cell of at least one of the electrical energy storage cell modules. In other embodiments, a load-absorbing member is connected to each electrical energy storage cell of at least one of the electrical energy storage cell modules.

In embodiments of a further aspect described in the present application, a portable electrical energy storage device includes a housing including a cover and a base. At least one electrical energy storage cell module including a plurality of electrical energy storage cells is contained in the housing and an electrical energy storage cell barrier including a thermal insulating material and an elastic material is located adjacent the cover with the thermal insulating material located between the cover and the elastic material. An elastic material is located adjacent the base and is between the electrical energy storage cell module and the base.

In accordance with embodiments of various aspects described in the present application, a portable electrical energy storage device includes a burst structure that remains intact when pressure within the portable electrical energy storage device is below a maximum internal pressure and ruptures when pressure within the portable electrical energy storage device exceeds the maximum internal pressure.

In embodiments of another described aspect, a portable electrical energy storage device includes a housing including a cover and a base. A first electrical energy storage cell module including a plurality of electrical energy storage cells and a second electrical energy storage cell module including a plurality of electrical energy storage cells are contained within the housing, with the second electrical energy storage cell module positioned adjacent the first electrical energy storage cell module. A third electrical energy storage cell module including a plurality of electrical energy storage cells is included in the housing and is positioned adjacent the second electrical energy storage cell module on a side of the second electrical energy storage cell module opposite from the first electrical energy storage cell module. A first electrical energy storage cell barrier including a thermal insulating material sandwiched between an elastic material is located between the first electrical energy storage cell module and the second electrical energy storage cell module. A second electrical energy storage cell barrier including a thermal insulating material sandwiched between an elastic material is located between the second electrical energy storage cell module and the third electrical energy storage module. A third electrical energy storage cell barrier including an elastic material is located between the first electrical energy storage cell module and the base and a fourth electrical energy storage cell barrier including a thermal insulating material and an elastic material is located between the third electrical energy storage cell module and the cover.

In another described embodiment, a portable electrical energy storage device includes a housing including a sidewall and a first electrical energy storage cell module including a plurality of electrical energy storage cells and located within the housing. A second electrical energy storage cell module including a plurality of electrical energy storage cells is also located within the housing adjacent the first electrical energy storage cell module. The portable electrical energy storage device includes a first electrical energy storage cell barrier comprising an electrical isolation layer of a dielectric material sandwiched between an electrical energy storage cell contact protection layer of an elastic material and a combustion barrier layer of a non-combustible material. The first electrical energy storage cell barrier is located between the first electrical energy storage cell module and the second electrical energy storage cell module. The electrical isolation layer of dielectric material of the first electrical energy storage cell barrier includes at least one biased vent and the combustion barrier layer of a non-combustible material of the first electrical energy storage cell barrier includes at least one biased vent. The portable electrical energy storage device further includes a second electrical energy storage cell barrier comprising an electrical isolation layer of a dielectric material sandwiched between an electrical energy storage cell contact protection layer of an elastic material and a combustion barrier layer of a non-combustible material. The electrical isolation layer of dielectric material of the second electrical energy storage cell barrier includes at least one biased vent and the combustion barrier layer of a non-combustible material of the second electrical energy storage cell barrier includes at least one biased vent. The second electrical energy storage cell barrier is located between the second electrical energy storage cell module and the first electrical energy storage cell barrier. In accordance with this described embodiment, the at least one biased vent included in the electrical isolation layer of dielectric material of the first electrical energy storage cell barrier and the at least one biased vent included in the combustion barrier layer of a non-combustible material of the first electrical energy storage cell barrier are biased to a closed position and movable from the closed position to an open position, the closed position impeding the flow of gas through the first electrical energy storage cell barrier and the open position impeding the flow of gas through the first electrical energy storage cell barrier to a lesser degree than the closed position. The at least one biased vent included in the electrical isolation layer of dielectric material of the second electrical energy storage cell barrier and the at least one biased vent included in the combustion barrier layer of a non-combustible material of the second electrical energy storage cell barrier are biased to a closed position and movable from the closed position to an open position, with the closed position impeding the flow of gas through the second electrical energy storage cell barrier and the open position impeding the flow of gas through the second electrical energy storage cell barrier to a lesser degree than the closed position.

In embodiments of a further aspect of a portable electrical energy storage cell device described herein, the portable electrical energy storage device includes a housing including a sidewall with a first electrical energy storage cell module including a plurality of electrical energy storage cells located within the housing. A second electrical energy storage cell module including a plurality of electrical energy storage cells is also located within the housing and adjacent the first electrical energy storage cell module. A first electrical energy storage cell barrier comprising a layer of a dielectric material sandwiched between a layer of an elastic material and a layer of a non-combustible material is located between the first electrical energy storage cell module and the second electrical energy storage cell module. The layer of dielectric material of the first electrical energy storage cell barrier including at least one biased vent and the layer of a non-combustible material of the first electrical energy storage cell barrier including at least one biased vent. The at least one biased vent included in the layer of dielectric material of the first electrical energy storage cell barrier and the at least one biased vent included in the layer of a non-combustible material of the first electrical energy storage cell barrier are biased to a closed position and movable from the closed position to an open position, with the closed position impeding the flow of gas through the first electrical energy storage cell barrier and the open position impeding the flow of gas through the first electrical energy storage cell barrier to a lesser degree than the closed position.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 13 is an isometric view of a portion of an electrical energy storage cell module with biased vents in a closed position, according to a non-limiting embodiment.

FIG. 14 is an isometric view of the electrical energy storage cell module of FIG. 13 showing the biased vents in an open position.

DETAILED DESCRIPTION

Figure 1:
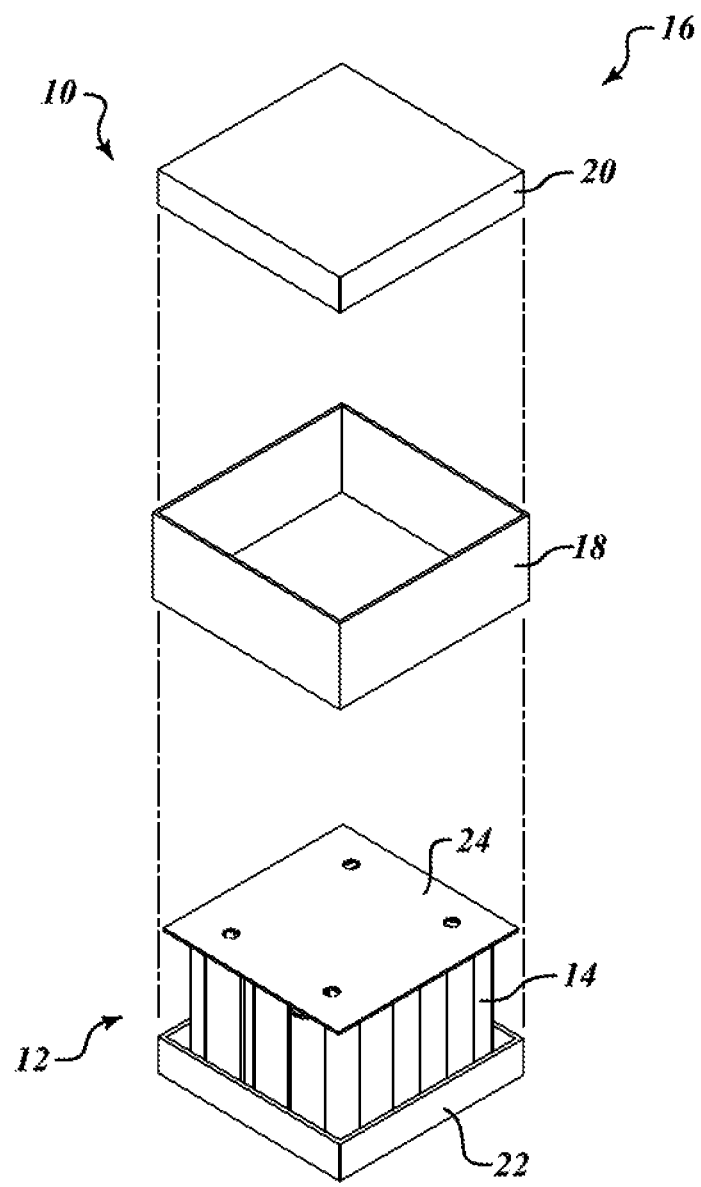
FIG. 1 is an isometric, partially exploded, view of a portable electrical energy storage device that includes some of the various components or structures described herein, according to one non-limiting illustrated embodiment.

It will be appreciated that, although specific embodiments of the subject matter of this application have been described herein for purposes of illustration, various modifications may be made without departing from the spirit and scope of the disclosed subject matter. Accordingly, the subject matter of this application is not limited except as by the appended claims.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electrical energy storage cells, e.g., batteries, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment.

The use of ordinals such as first, second and third does not necessarily imply a ranked sense of order, but rather may only distinguish between multiple instances of an act or structure.

Reference to portable electrical power storage device or electrical energy storage device means any device capable of storing electrical power and releasing stored electrical power including, but not limited to, batteries, supercapacitors or ultracapacitors, and modules made up of a plurality of the same. Reference to portable electrical energy storage cell(s) means a chemical storage cell or cells, for instance rechargeable or secondary battery cells including, but not limited to, nickel-cadmium alloy battery cells or lithium-ion battery cells. A non-limiting example of portable electrical energy storage cells is illustrated in the figures as being cylindrical, e.g., similar in size and shape to conventional AAA size batteries; however, the present disclosure is not limited to this illustrated form factor.

The headings and Abstract of the Disclosure provided herein are for convenience only and do not interpret the scope or meaning of the embodiments.

Generally described, the present disclosure is directed to examples of portable electrical energy storage devices suitable to power electric devices such as electric powered or hybrid type vehicles, e.g., motorcycles, scooters and electric bicycles, electric powered tools, electric powered lawn and garden equipment, and the like, which include one or more electrical energy storage cell barriers that serve to prevent migration and propagation of electrical energy storage cell destabilizing thermal energy from one electrical energy storage cell or module to another electrical energy storage cell or module. Further description of portable electrical energy storage devices in accordance with embodiments described herein is provided in the context of portable electrical energy storage devices used with electric scooters; however, it should be understood that portable electrical energy storage devices in accordance with embodiments described herein are not limited to applications in electric scooters. In addition, portable electrical energy storage devices are described below with reference to a single electrical energy storage cell module containing a plurality of electrical energy storage cells and a pair of electrical energy storage cell modules each containing a plurality of electrical energy storage cells. The present description is not limited to electrical energy storage devices that include only a single electrical energy storage cell module or only a pair of electrical energy storage cell modules and encompasses portable electrical energy storage devices that include more than a pair of electrical energy storage cell modules.

In a specific application wherein portable electrical energy storage devices in accordance with embodiments described in the present application are utilized to power electric vehicles, such as an electric scooter, one or more portable electrical energy storage device is received in a compartment located beneath the user, e.g., under the seat of the scooter. Typically, the portable electrical energy storage device includes a handle by which the user carries the portable electrical energy storage device and places it into and removes it from the compartment.

Referring to FIG. 1, a portable electrical energy storage device 10 includes an electrical energy storage cell module 12 including a plurality of individual electrical energy storage cells 14. The electrical energy storage cell module 12 is housed within a housing 16 that includes a shell 18, a cover 20, and a base 22. Shell 18, cover 20 and base 22 are formed from the same or different rigid noncombustible material, such as a metal or non-metal such as a plastic. An exemplary non-limiting example of a metal is aluminum. Though not illustrated, cover 20 may include a handle to facilitate carrying of the electrical energy storage device. Also, though not illustrated, base 22 includes electrically conductive elements passing through shell 18 and cooperating with electrically conductive elements within shell 18 to provide electrical connection to energy storage cell module 12 from a location external to portable electrical energy storage device 10. In addition, electrically conductive elements are associated with each electrical energy storage cell module and electrically connect individual electrical energy storage cells and also electrically connect electrical energy storage cell modules. Shell 18 is sealed in a gas-tight manner to cover 20 and to base 22 and forms a gas-tight housing. The electrically conductive elements passing through base 22 are also sealed in a gastight manner to base 22. Thus, shell 18, cover 20, and base 22 form a gas-tight enclosure containing electrical energy storage cell module 12. Because the shell 18, cover 20 and base 22 form a gastight enclosure, the enclosure can be evacuated to remove combustion supporting oxygen. Removing combustion supporting oxygen reduces the amount of combustion that can occur within the sealed enclosure. Alternatively, the enclosure can be purged of combustion supporting oxygen by displacing oxygen with gases incapable of supporting combustion, such as nitrogen. Shell 18 can be sealed to cover 20 and base 22 using conventional materials such as mating female and male members alone or in combination with adhesive materials. Alternatively or additionally, gaskets can be provided to seal shell 18 to cover 20 and base 22. Similarly, the electrically conductive elements passing through base 22 can be sealed to base 22 using conventional materials such as adhesive materials and/or gaskets.

The interstices between adjacent electrical energy storage cells 14 making up electrical energy storage cell module 12, and void space between electrical energy storage cells 14 and housing 16, are occupied by a thermal energy absorbing material capable of latent heat storage. Suitable thermal energy absorbing materials absorb or release thermal energy without a substantial change in temperature of the material, e.g., through a phase change. Examples of thermal energy absorbing materials include materials capable of absorbing and storing large amounts of energy via a phase change. Such materials are commonly referred to as phase change materials. Phase change materials are generally understood to be limited to materials wherein the phase change is between a solid and a liquid; however, phase change materials are not limited to those that change between a solid and a liquid state. Phase change materials can be organic materials, such as paraffins and fatty acids. Phase change materials can also be inorganic, such as salt hydrates. Phase change materials can also be eutectic materials or hygroscopic materials.

As noted in the Background, though rare, internal or external short-circuiting of lithium-ion electrical energy storage cells can result in the temperature of an individual electrical energy storage cell increasing to a level at which the cathode may react with and decompose the electrolyte solution. If this occurs, additional thermal energy is produced and the gases that are produced from the decomposition of the electrolyte solution can react with the cathode, liberating more thermal energy. The production of gases within an electrical energy storage cell causes the pressure within the sealed cell to increase. If the pressure within the cell increases above the designed cell burst pressure, the cell ruptures and the gas escapes. During these reactions, a limited amount of oxygen is produced which can support further combustion. If the escaping gases are exposed to temperatures above that at which the gases ignite, the gases may ignite and combust. In addition, if the thermal energy released from one short-circuited cell and the combustion of gases escaping a burst cell may cause the temperature of other electrical energy storage cells to rise above a temperature at which such cells are normally stable, cathodes of these other electrical energy storage cells may then react with the electrolyte solution and produce gases that cause these cells to burst and combust. Though such short circuit initiated combustion is rare, good design and concern for the safety of the user dictates that steps be taken to protect users in the unlikely event electrical energy storage cells fail.

Figure 2:
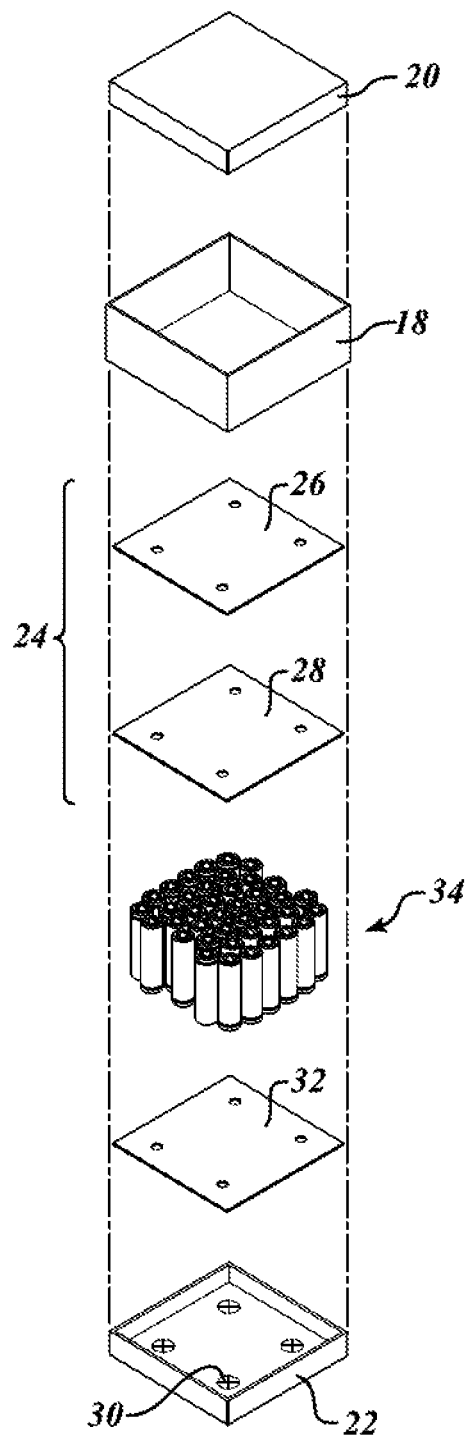
FIG. 2 is an isometric, more fully exploded, view of the portable electrical energy storage device of FIG. 1.

Continuing to refer to FIG. 1 and referring additionally to FIG. 2, one non-limiting embodiment of one aspect of a portable electrical energy storage device described herein includes a single electrical energy storage cell module 12 including a plurality of electrical energy storage cells 14. In the embodiment illustrated in FIG. 1, the single electrical energy storage cell module 12 includes multiple individual electrical energy storage cells 14. It should be understood that a greater number or a lesser number of individual electrical energy storage cells may be utilized compared to the number illustrated in FIG. 1.

Though not specifically illustrated in order to avoid obscuring other features of the disclosed subject matter, the interstices between electrical energy storage cells 14 are occupied by a phase change material. The specific phase change material utilized is selected taking into consideration a number of factors, including the magnitude of thermal energy the phase change material is able to absorb before completing its phase change and its temperature begins to rise. Generally, phase change materials that are able to absorb more energy before the change of state is completed are preferred over phase change materials that complete the change of state upon absorbing less thermal energy. Exemplary phase change materials include organic materials, such as paraffins and fatty acids. Phase change materials can also be inorganic, such as salt hydrates. Phase change materials can also be eutectic materials or hygroscopic materials. In the embodiment illustrated in FIGS. 1 and 2, an electrical energy storage cell barrier 24 is located above electrical energy storage cell module 12. Electrical energy storage cell barrier 24 includes a layer of thermal insulating material 26 and a layer of elastic material 28. Both the layer of thermal insulating material 26 and the layer of elastic material 28 are sized so as to overlap the entire upper surface of the electrical energy storage cell module 12. The periphery of the layer of thermal insulating material 26 and the periphery of the layer of elastic material 28 is shaped and sized to fit closely within shell 18. The close fit between the layer of elastic material 28 and the layer of thermal insulating material 26 need not be so closely toleranced that a gastight seal is provided between these layers and the internal surface of shell 18; however, the closer the fit between the inner surface of shell 18 and at least one of the layer of thermal insulating material 26 and the layer of elastic material 28, the better the electrical energy storage cell barrier 24 is able to block thermal energy and flames from combustion passing between the inner surface of shell 18 and the outer periphery of the thermal insulating material 26 and/or the elastic material 28. The cooperation between the layer of thermal insulating material 26 and/or the layer of elastic material 28 and the inner surface of shell 18 impedes and more preferably prevents migration of thermal energy and flames from combustion of an electrical energy storage cell 14 in the electrical energy storage cell module 12 to locations on the side of the electrical energy storage cell barrier 24 opposite the side adjacent to the electrical energy storage cell module 12.

Thermal insulating material 26 serves as a thermal insulation layer and barrier to migration of thermal energy produced by combustion of an electrical energy storage cell within electrical energy storage cell module 12 to the side of the layer of thermal insulating material 26 that is opposite electrical energy storage cell module 12. By providing a barrier to migration of thermal energy from one side of electrical energy storage cell barrier 24 to the other side, propagation of failure of electrical energy storage cells induced by elevated temperatures is reduced or avoided. The thermal insulating material 26 is chosen from materials that have a thermal conductivity such that the thermal insulating material impedes the transfer of thermal energy through the thermal insulating material. In yet other non-limiting examples, thermal insulating material 26 is formed from a material that is electrically nonconductive. The electrically nonconductive property of thermal insulating material 26 prevents the thermal insulating material from adversely affecting, e.g., short-circuiting, conductive features electrically connected to the electrical energy storage cells 14. Non-limiting examples of thermal insulating material 26 include materials that have a thermal conductivity that is less than about 0.5 BTU/ft$^2$/hr/inch at temperatures corresponding to temperatures where the electrical energy storage cells vent and ignition occurs. In addition, the thermal insulating material is also fire resistant at temperatures greater than about 130° C. The thermal insulating material may include ceramic materials, vermiculite-based materials or other materials known to provide thermal insulating properties. The carrier for the ceramic materials may be paper-based, ceramic impregnated cloths, fiberglass or other materials capable of being formed into thin sheets containing thermal insulating materials. Non-limiting examples of thermal insulating material include materials comprising ceramic fibers. Such ceramic fibers can be formed from alumina, mullite, silicon carbide, zirconia or carbon. In specific embodiments, the layer of thermal insulating material 26 includes ceramic fibers in a paper-like form. Though not intending to be limited to such, some ceramic paper materials are fire resistant to 1260° C. or higher. According to embodiments illustrated in FIGS. 1 and 2, the layer of thermal insulating material 26 has a thickness ranging from about 0.5 mm to about 2 mm, though thermal insulating material may be thicker or thinner depending on, among other things, of thermal insulation desired.

Elastic material 28 serves as a combustion barrier by providing a physical non-combustible barrier to migration of combustion of an electrical energy storage cell 14 within electrical energy storage cell module 12 to the side of the energy storage cell barrier 24 opposite the electrical energy storage cell module 12. Non-limiting examples of materials for the layer of elastic material 28 include elastic materials that are noncombustible at temperatures of about 130° C. and higher. In non-limiting embodiments, elastic material 28 provides protection to terminals of the electrical energy storage cells 14 by being formed from a material that is softer than the material from which the electrical energy storage cell terminals are formed. In yet other non-limiting examples, elastic material 28 is formed from a material that is electrically nonconductive. The electrically nonconductive property of elastic material 28 prevents the elastic material from adversely affecting, e.g., short-circuiting, conductive features electrically connected to the electrical energy storage cells 14. Non-limiting examples of materials for elastic material 28 include materials that have a hardness less than about 50 to 100 on a Shore scale and an electrical resistivity of greater than about 10 to about 20 ohms or more.

In specific embodiments, elastic material is a fluoropolymer rubber, butyl rubber, chlorosulfonated polyethylene rubber, epichlorohydrin rubber, ethylene propylene rubber, fluoroelastomer rubber, fluorosilicone rubber, hydrogenated nitrile rubber, natural rubber, nitrile rubber, perfluoroelastomer rubber, polyacrylic rubber, polychloroprene rubber, polyurethane rubber, silicone rubber and styrene butadiene rubber. According to embodiments illustrated in FIGS. 1 and 2, the layer of elastic material 28 is about 0.5 mm to 2.0 mm thick, though elastic material may be thicker or thinner, depending, among other things, on the amount of combustion migration inhibition and/or shock absorption desired.

As described in the Background, in applications where only a single electrical energy storage cell is utilized, combustion of the cell creates an undesirable situation. The severity of this situation is increased when a plurality of electrical energy storage cells are deployed in the form of a battery bank or module. For example, when the electrical energy storage cell includes lithium-ion chemistry, combustion of the lithium-ion cell can produce local temperatures above the temperature at which lithium-ion cells become unstable, burst and combust. Thus, it is possible for the combustion of a single lithium-ion cell in a bank of lithium-ion cells to cause other cells in the bank to burst, ignite and burn. Fortunately, lithium-ion cells have proven to be very safe and bursting and combustion of lithium-ion cells is very rare. Nonetheless, in the interest of user safety and acceptance of electrical energy storage cells as power sources for electric vehicles, such as scooters, it is important to take steps to reduce the already low likelihood of bursting and combustion of a lithium-ion electrical energy storage cell and to manage combustion in the unlikely event that such a cell should ignite.

In accordance with embodiments described herein, combustion of an electrical energy storage cell or combustion of a plurality of electrical energy storage cells is managed through a combination of the following features of embodiments described herein. First, advantage is taken of the need for oxygen to initiate ignition of gases from a burst cell and maintain combustion of an ignited cell. Second, in the event combustion occurs, migration of thermal energy from a failed and potentially combusting cell to other cells is restricted. Third, up to a certain threshold pressure, gases formed as a result of cell failure and gases formed from the combustion of such gases are contained within the airtight sealed electrical energy storage device. Fourth, bursting of the electrical energy storage device is controlled to avoid uncontrolled bursting in unpredictable and potentially dangerous directions.

At a first level, containing lithium-ion electrical energy storage cells in an oxygen free airtight housing isolates the cells from oxygen necessary to ignite and sustain combustion of flammable gases that may exit a burst failed cell. Thus, in the unlikely event of a single cell failure resulting in bursting of the cell and ignition of gas vented from the cell, oxygen available to sustain combustion is limited to oxygen produced by reactions occurring between reactants within the failed cell. Limiting the oxygen available to support combustion to the oxygen generated in situ minimizes the length of time combustion within the electrical energy storage device occurs, thereby reducing the likelihood the temperature within the device will be elevated to a level where failure and subsequent bursting and combustion of gases from other cells occurs. In addition, the absence of oxygen within the electrical energy storage device impedes combustion of the thermal energy absorbing material. For example, phase change materials used as thermal energy absorbing material are combustible upon changing to a liquid state. By limiting oxygen content within the electrical energy storage device, combustion of the phase change material is avoided.

Typically, venting and combustion of gases from an individual electrical energy storage cell lasts for only a few seconds. During this time localized temperatures can approach temperatures at which adjacent electrical energy storage cells may become unstable. In order to isolate otherwise stable electrical energy storage cells from thermal energy emanating from a failed cell, the interstices between adjacent electrical energy storage cells is occupied by the thermal energy absorbing material described above. The thermal energy absorbing material absorbs thermal energy resulting from failure of the cell and combustion of gases emanating from the failed cell without an increase in the temperature of the thermal energy absorbing material. The amount of thermal energy that the thermal energy absorbing material present within the electrical energy storage device can absorb before it begins to increase in temperature depends upon the composition of the thermal energy absorbing material and the volume of material present. For example, a volume of thermal energy absorbing material will be sufficient to absorb the entire amount of thermal energy produced by failure and combustion of a certain number of cells; however, if additional cells fail and combust, the thermal energy absorbing material will be unable to absorb the additional thermal energy without increasing in temperature.

In the unlikely event failed electrical energy storage cells produce thermal energy that exceeds the amount of thermal energy the thermal energy absorbing material can absorb, the likelihood that additional electrical energy storage cells may fail and combust increases, resulting in a potential for self-propagating failure and combustion of additional cells. Such self-propagating failure and combustion could result in the build-up of pressure within the electrical energy storage device to levels that could, in the absence of features included in embodiments described herein, result in uncontrolled bursting of the device. Electrical energy storage cell devices of the type described herein include a burst structure designed to burst at a predetermined location and in a predetermined direction in the event the pressure within the device exceeds a threshold amount. Such burst structures are described below in more detail. Such pressure threshold can be set any level, provided it is less than the pressure at which the device would burst at locations where bursting is not desired. The pressure at which the electrical energy storage device bursts may also take into consideration the pressure build-up resulting from the failure and combustion of more than X number of individual cells, where X is the number of cells above which failure and combustion of such number of cells results in the pressure within the device exceeding the pressure necessary to burst the electrical energy storage device at undesired locations. In accordance with embodiments including the burst structure described herein, the device housing will burst and direct hot gases and flames in a direction that reduces the risk of injury to people in the vicinity of the housing.

Figure 5:
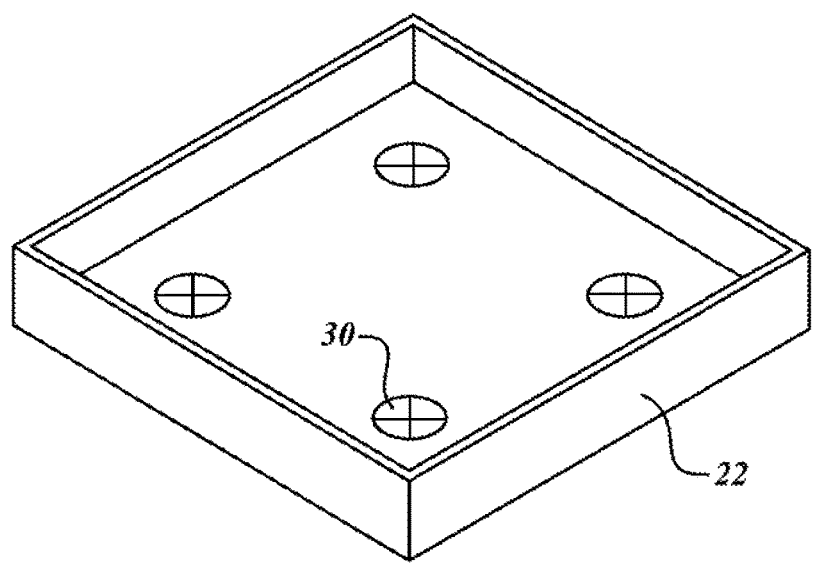
FIG. 5 is an isometric view of burst structures formed in accordance with one non-limiting illustrated embodiment.

Referring to FIG. 5, in the embodiment illustrated in FIGS. 1 and 2, base 22 is provided with a burst structure 30. Burst structure 30 in FIG. 5 includes a "scored" feature in the bottom of base 22. Scoring of the bottom of base 22 produces scored portions that are thinner than the non-scored portions of base 22. The scoring is provided by molding the scoring into the base or it can be provided by stamping the scoring into the base. The scoring can also be provided by other well-understood techniques. Although burst structure 30 is illustrated in FIG. 5 as having scored portions, it should be understood that features other than a scored feature can be provided as a burst structure. For example, the burst structure can take the form of a pressure relief valve or other structure or hardware that will vent the housing 16 when pressure within the housing exceeds a predetermined level.

Burst structure 30 is designed to fracture or break open once the pressure within housing 16 reaches a predetermined pressure. The predetermined pressure at which the burst structure fractures may be any pressure, for example, a pressure above the pressure that builds up within the housing upon the ignition and combustion of a predetermined number of individual electrical energy storage cells 14 within housing 16. For example, if the number of electrical energy storage cells that ignite and combust is below the predetermined number, the increase in pressure within housing 16 will not be such as to create a significant risk of uncontrolled bursting of housing 16. On the other hand, if the number of electrical energy storage cells that ignite and combust is above the predetermined number, the increase in pressure within the housing increases the risk that the housing will burst uncontrollably. Burst structure 30 is designed to fracture or break open once the pressure within housing 16 reaches the predetermined pressure. In the embodiment illustrated in FIG. 5, burst structure 30 is located in the bottom of base 22. Thus, when burst structure 30 bursts, hot combustion gases and flames can exit the bottom of portable electrical energy storage device 10 and be directed downward. Though burst structure 30 is illustrated as being located in the bottom of base 22, it can also be located elsewhere. For example, burst structure 30 can be located in the side of base 22 or in the side of shell 18 or in the top or side of cover 20. The specific location of the burst structure will generally be selected so that combustion gases and flames are directed out of housing 16 in a safe direction, e.g., away from people that are near housing 16 in normal use. In an embodiment where the electrical energy storage device is located below the seat of an electrically powered scooter, burst structure 30 is preferably located in the bottom of base 22 such that hot gases and flames will exit housing 16 in a direction away from the user.

Referring back to FIG. 2, on the side of electrical energy storage cell module 12, adjacent base 22, a layer of elastic material 32 separates the electrical energy storage cells 14 of electrical energy storage cell module 12 from base 22 that includes burst structure 30. At this location, a layer of thermal insulating material is omitted because propagation of thermal energy and combustion is of less concern because in the illustrated embodiment, there are no additional electrical energy storage cells below cell module 12 and base 22 is located furthest from the user.

Figure 3:
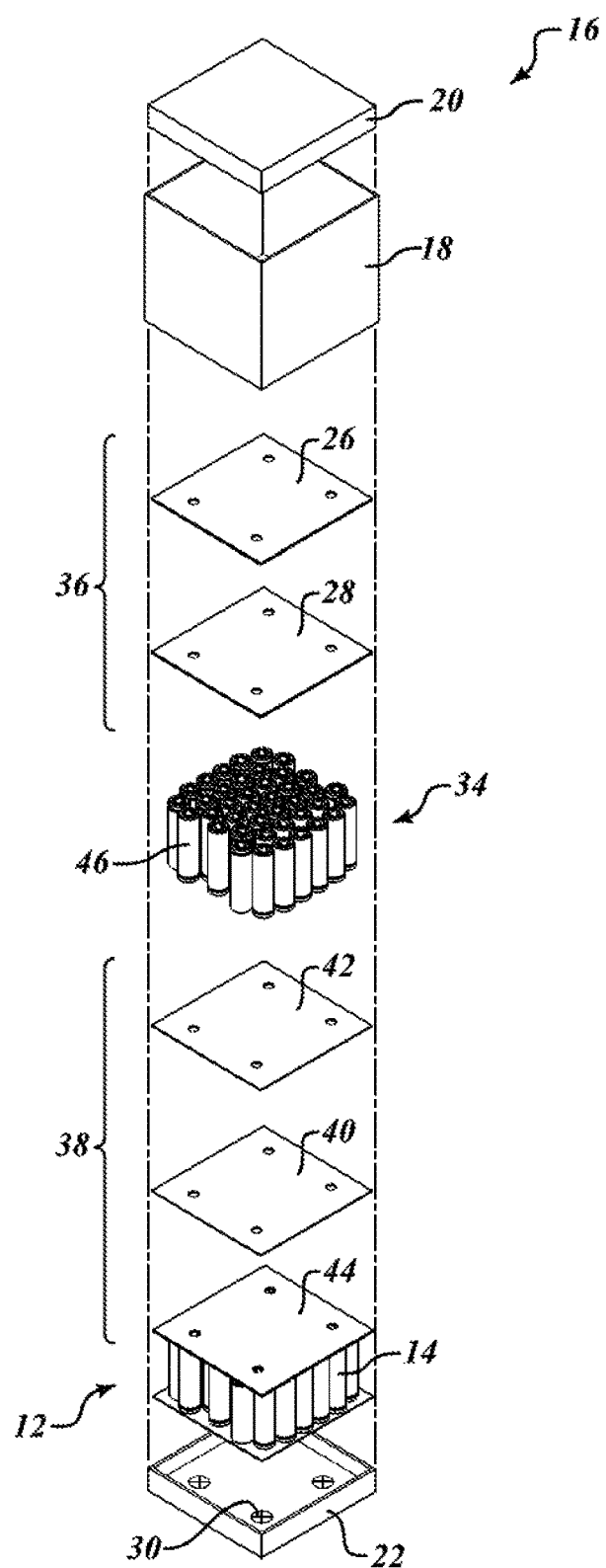
FIG. 3 is an isometric, partially exploded, view of another embodiment of a portable electrical energy storage device that includes some of the various components or structures described herein, according to one non-limiting illustrated embodiment.

Referring to FIG. 3, another embodiment of an electrical energy storage cell device is illustrated and includes more than one electrical energy storage cell module 12. In the embodiment illustrated in FIG. 3, a second electrical energy storage cell module 34 including a plurality of individual electrical energy storage cells 46 is located above first electrical energy storage cell module 12 and includes a plurality of electrical energy storage cells 14. Positioned above second electrical energy storage cell module 34 is a second electrical energy storage cell barrier 36 identical to electrical energy storage cell barrier 24 described with reference to FIG. 1. The embodiment of FIG. 3 also differs from the embodiment illustrated in FIG. 1 by including a first electrical energy storage cell barrier 38 that includes a layer of thermal insulating material 40 sandwiched between a layer of elastic material 42 and a layer of elastic material 44. The elastic materials 42 and 44 and the thermal insulating material 40 are identical in nature to the elastic material 32 and thermal insulating material 26 described above with reference to FIGS. 1 and 2. The second layer of elastic material 42 of first electrical energy storage cell barrier 38 protects electrical terminals of the electrical energy storage cells 46 in electrical energy storage cell module 34.

Unlike the embodiment illustrated and described with reference to FIGS. 1 and 2, the embodiment of an electrical energy storage device illustrated in FIG. 3 includes a second electrical energy storage cell module 34 above electrical energy storage cell module 12. The provision of a second electrical energy storage cell module 34 renders it desirable to protect electrical energy storage cell module 34 from combustion that may occur within first electrical energy storage cell module 12 and vice versa. This protection is provided by the three-layer electrical energy storage cell barrier 38.

It should be understood that although embodiments including a single electrical energy storage cell module and two electrical energy storage cell modules have been described above with reference to FIGS. 1-3, in accordance with the subject matter described herein, more than two electrical energy storage cell modules can be provided. When more than two electrical energy storage cell modules are provided, in accordance with embodiments described herein, a three layer electrical energy storage cell barrier similar to electrical energy storage cell barrier 38 in FIG. 3 is provided between electrical energy storage cell modules.

In addition, although specific embodiments of electrical energy storage cell barriers 24, 36 and 38 have been described, it should be understood that additional layers of thermal insulating material can be provided if additional thermal insulation is desired. Similarly, additional layers of elastic material can be provided if further protection of electric terminals is desired.

Figure 4:
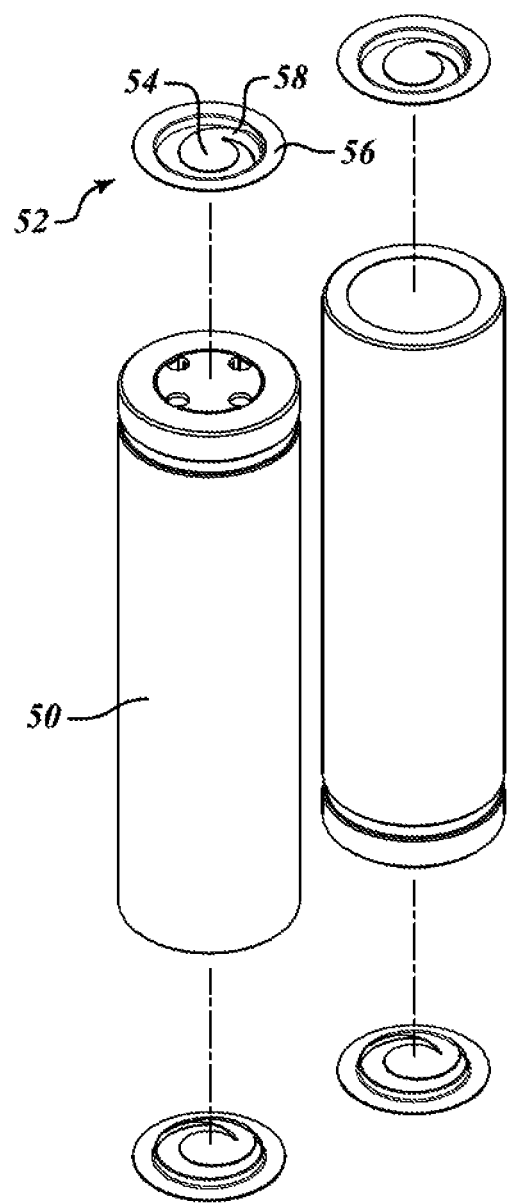
FIG. 4 is an isometric, partially exploded, view of two individual electrical energy storage cells and four load-absorbing members.

Referring to FIG. 4, two individual portable electrical energy storage cells 50 are illustrated. These electrical energy storage cells may be identical to electrical energy storage cells 14 and 46 described with reference to FIGS. 1-3. As noted in the Background, in rare situations, internal or external short-circuiting of electrical energy storage cells, such as lithium-ion cells, can occur. Such short circuits can occur when a cell experiences a severe impact or shock. The thin nature of the polymer separators in the cell makes them susceptible to short-circuiting in the event micrometer-sized metal particles find their way between anode and cathode. In accordance with embodiments described herein, load-absorbing members 52 which can absorb impacts and shock that might otherwise damage the internal polymer separators or produce small metal particles that, should they find their way into the electrical energy storage cell could result in a short circuit, are provided on individual portable electrical energy storage cells 50. In the embodiment illustrated in FIG. 4, load-absorbing members 52 are provided on each end of portable electrical energy storage cells 50. It should be understood that the present disclosure is not limited to including load-absorbing members 52 on both ends of electrical energy storage cells 50 and that load-absorbing members 52 can be provided on only one end of an electrical energy storage cell 50.

Load member 52 includes a central tab 54 that is suspended from an annular load member body 56 by an arcuate cantilevered arm 58. In the embodiment illustrated in FIG. 4, central tab 54 lies in a plane different from, e.g., below, the plane occupied by load member body 56. Cantilevered arm 58 extends from annular load member body 56 to central tab 54. Because central tab 54 and annular load member body 56 lie in different planes, cantilevered arm 58 extends between both planes. Accordingly, cantilevered arm 58 serves as a spring-like member between central tab 54 and annular load member body 56. With reference to load member 52 located on top of electrical energy storage cell 50 in FIG. 4, central tab 54 is attached to the top of storage cell 50. Annular load member body 56 is thus suspended above the plane in which central tab 54 lies. When a load is placed on annular load member body 56, cantilevered arm 58 absorbs some or all of the load, thereby isolating electrical energy storage cell 50 from such load. In the embodiment illustrated in FIG. 4, cantilevered arm 58 is illustrated as being an arcuate member and central tab 54 is illustrated as a circular member. FIG. 4 illustrates non-limiting embodiments of these features and it should be understood that central tab 54 can have a different shape, such as a square or triangle, and cantilevered arm 58 need not be arcuate, for example it could be straight.

Figure 6:
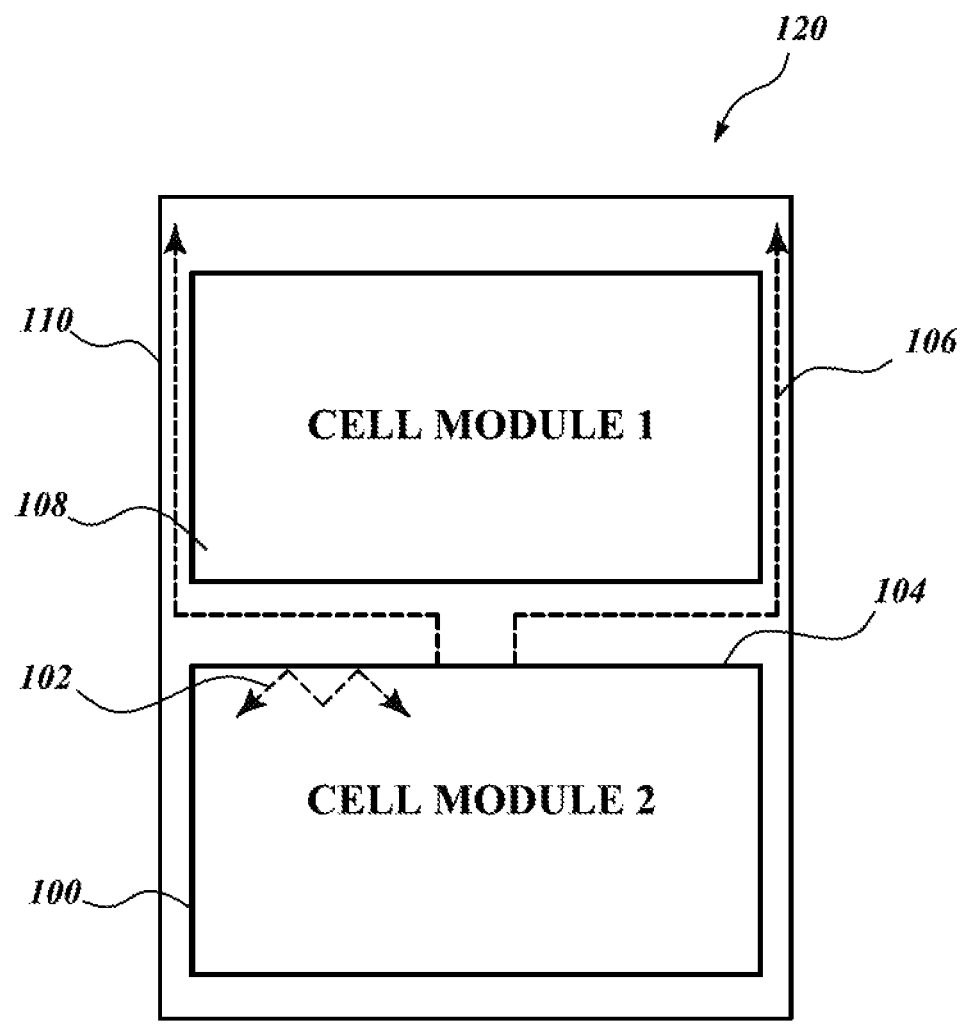
FIG. 6 is a schematic illustration of an electrical energy storage device in accordance with non-limiting embodiments described herein illustrating potential paths taken by gas and thermal energy emanating from a failed electrical energy storage cell of an electrical energy storage cell module.

FIG. 6 illustrates schematically several different paths gases and thermal energy emanating from a failed electrical energy storage cell within second electrical energy storage cell module 100 may take. In the first instance schematically represented by dotted line 102, gases and thermal energy emanating from an upper end of an electrical energy storage cell (not shown) making up a portion of electrical energy storage cell module 100 impinging upon the inner surface of a top cover 104 of second electrical energy storage cell module 100, are reflected by the inner surface of top cover 104 and are contained within second electrical energy storage cell module 100. The deflection of these gases and thermal energy towards the interior of the second electrical energy storage cell module is undesirable for at least the reasons that the gases and thermal energy may cause damage to otherwise undamaged electrical energy storage cells within electrical energy storage cell module 100. For example, the thermal energy from combustion of the gases may cause otherwise undamaged electrical energy storage cells to self-ignite which could propagate a thermal runaway of the electrical energy storage cell module 100. In addition, combustion of the gases within second electrical energy storage cell module 100 may result in an increase in pressure within second electrical energy storage cell module 100. If such pressure buildup exceeds the burst pressure of second electrical energy storage cell module 100, second electrical energy storage cell module 100 may burst, possibly with explosive force.

In another instance, represented schematically by dotted line 106, the gases and thermal energy pass through cover 104 and escape second electrical energy storage cell module 100. The gases and thermal energy flow around first electrical energy storage cell module 108. While this instance may have a reduced likelihood that the gases and thermal energy cause electrical energy storage cells within second electrical energy storage cell module 100 to fail, rupture, or ignite, or that second electrical energy storage cell module 100 will burst, there is an increased risk that the gases and thermal energy traveling along dotted line 106 may cause electrical energy storage cells within first electrical energy storage cell module 108 to fail, rupture or ignite which could lead to an increased risk that portable electrical energy storage device 120 will burst. Ignition of electrical energy storage cells in first electrical energy storage cell module 108 could occur when localized temperatures within first electrical energy storage cell module rise above temperatures at which failure and/or ignition of individual portable electrical energy storage cells occurs. For example, gases and thermal energy emanating from electrical storage cell module 100 will impinge upon the underside of first electrical energy storage cell module 108 and could cause localized temperatures within first electrical energy storage cell module 108 to rise above temperatures at which individual electrical energy storage cells within electrical energy storage cell module 108 ignite and/or rupture. Gases and thermal energy that impinge upon the underside of first electrical energy storage cell module 108 may dissipate and move to the periphery of first electrical energy storage cell module 108 where they may pass between electrical energy storage cell module 108 and shell 110 of the illustrated portable electrical energy storage device 120. Gases and thermal energy present in this location could cause localized temperatures within first electrical energy storage cell module 108 to exceed temperatures at which individual electrical energy storage cells within electrical energy storage cell module 108 fail, rupture and/or ignite.

Figure 7:
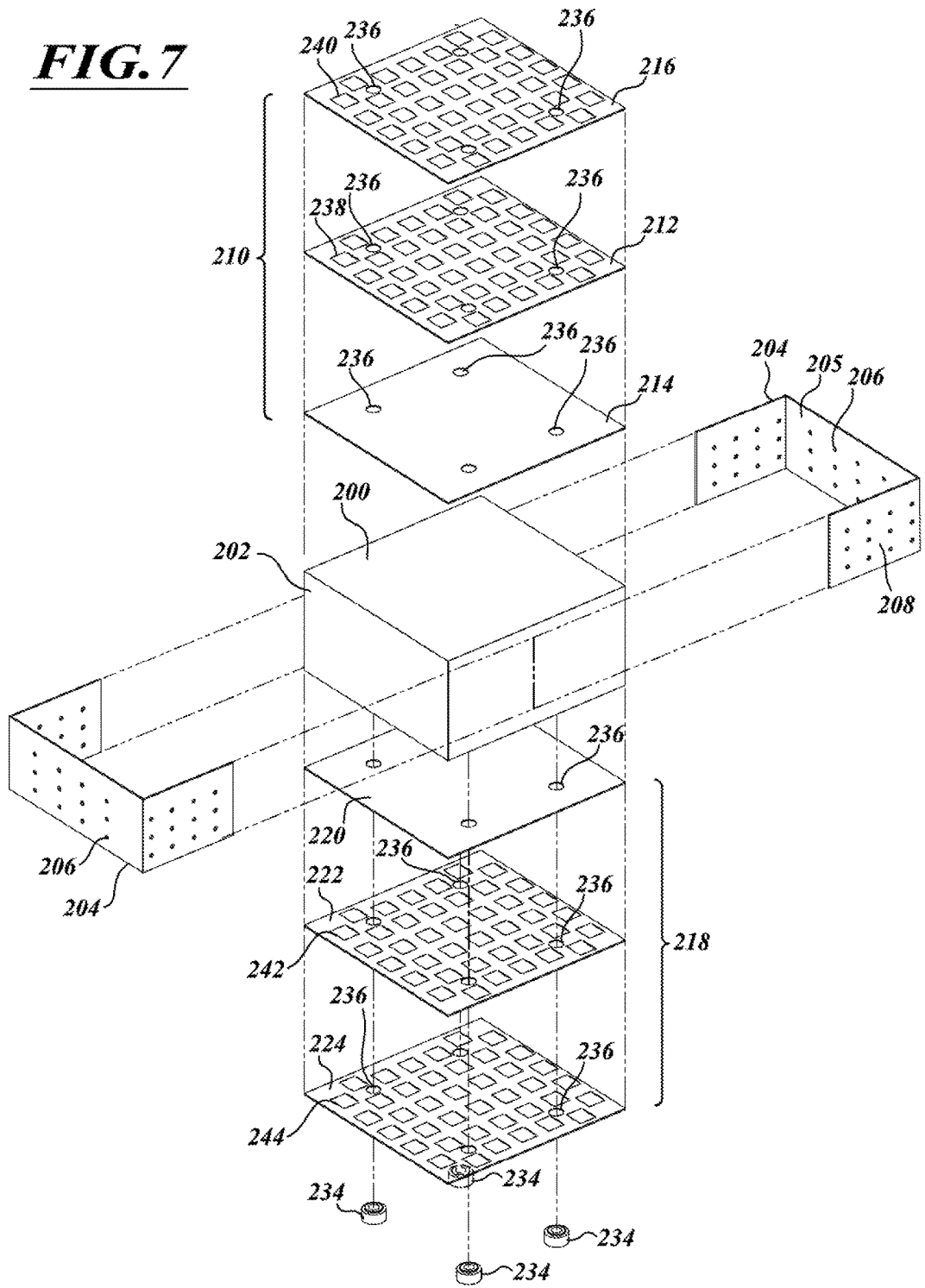
FIG. 7 is an exploded view of an electrical energy storage cell module of a portable electrical energy storage device that include some of the various components or structures described herein, according to non-limiting embodiments described herein.

Referring to FIG. 7, an exploded view of an electrical energy storage device in accordance with non-limiting embodiments described herein includes an electrical energy storage cell module 200. Electrical energy storage cell module 200 is illustrated schematically; however, it is understood that module 200 includes a plurality of individual electrical energy storage cells similar to those illustrated in FIGS. 2 and 3. In addition, electrical energy storage cell module 200 is illustrated schematically as a rectangular module; however, electrical energy storage cell module 200 is not limited to rectangular shapes and may take other shapes such as a cylinder or a rectangular shape with rounded corners. Though not illustrated, module 200 includes electrical connections to electrically connect individual electrical energy storage cells within module 200 and connections to electrically connect module 200 to devices powered by module 200. Module 200 includes an outer wall 202 defining a periphery of module 200.

Positioned adjacent the four sides of outer wall 202 are a pair of module sidewalls 204. Each module sidewall 204 includes an inner surface 205 which faces electrical energy storage cell module 200 and an outer surface 208 on the side of module sidewall 204 opposite inner surface 205. In the illustrated embodiment, outer surface 208 faces away from electrical energy storage cell module 200. In non-limiting embodiments of FIG. 7, module sidewall 204 is illustrated as being two parts that are mirror images of each other. It should be understood that module sidewalls 204 can be comprised of a single part which slides onto module 200 or can be comprised of more than two parts. Module sidewall 204 includes a plurality of vents 206 passing through module sidewall 204 from its inner surface 205 to its outer surface 208. In the illustrated embodiment, vents 206 are shown being round and aligned in a plurality of vertical columns. Vents 206 are not limited to being round and can be other shapes, such as oval or rectangular. In addition, vents 206 need not be provided in a plurality of vertical columns and can be arranged in different formations other than vertical columns. Vents 206 are located in module sidewall 204 at locations which correspond to void spaces within electrical energy storage cell module 200. Such void spaces occur between individual electrical energy storage cells within cell module 200. By aligning vents 206 with such void spaces, flow of fluids that promote convective or other types of heat transfer between individual electrical energy storage cells and the fluid and one side of module sidewall 204 and an opposite side of module sidewall 204 can more readily occur, e.g., during normal operation. Though not illustrated, in certain embodiments, module sidewall 204 can be shaped so that it matches the contour of the outer side of electrical energy storage cell module 200 resulting from the placement of individual electrical energy storage cells at the periphery of electrical energy storage cell module 200. Materials used for sidewall 204 are of the type that can withstand high temperatures associated with gases and thermal energy that are generated upon failure of an electrical energy storage cell. Such temperatures can be in the range of 1000° C. or higher. Exemplary materials for sidewall 204 include metals or plastics or other materials capable of withstanding such high temperatures without combusting or distorting significantly.

Located above electrical energy storage cell module 200 is an electrical energy storage cell barrier 210. Electrical energy storage cell barrier 210 serves several functions, including serving as a barrier to the spread of combustion from electrical energy storage cell module 200 to another electrical energy storage cell module, serving to electrically isolate electrodes of the electrical energy storage cells within electrical energy storage cell module 200 from electrically conductive components of the electrical storage cell barrier 210, providing a barrier to heat transfer from or to electrical energy storage cell module 200 and protecting electrodes of electrical energy storage cells within electrical energy storage cell module 200 from damage caused by contact with rigid or abrasive materials of electrical energy storage cell barrier 210. In non-limiting embodiments of FIG. 7, electrical energy storage cell barrier 210 includes an electrical isolation layer 212 of a dielectric material sandwiched between an electrical energy storage cell contact protection layer 214 of an elastic material and a combustion barrier layer 216 of a non-combustible material.

Electrical energy storage cell contact protection layer 214 is an elastic material, non-limiting examples of which include elastic materials that are noncombustible at temperatures of about 130° C. and higher. The phrase "elastic material" refers to materials that are flexible, resilient and capable of substantially returning to their original shape after deformation. Elastic materials of the type described herein are not limited to flexible and resilient materials that return fully to their original shape after being deformed. Elastic materials in accordance with non-limiting examples described herein include materials that are flexible and resilient and which after being deformed do not return fully to their original shape. In non-limiting embodiments, electrical energy storage cell contact protection layer 214 provides physical protection to terminals of electrical energy storage cells making up a portion of electrical energy storage cell module 200 by being formed from a material that is softer than the material making up the electrical energy storage cell terminals. In yet other non-limiting examples, the elastic material of the electrical energy storage cell contact protection layer 214 is electrically nonconductive. The electrically nonconductive property of electrical energy storage cell contact protection layer 214 prevents electrical energy storage cell contact protection layer 214 from adversely affecting, e.g., short-circuiting, the terminals or conductive features electrically connected to the electrical energy storage cells. Non-limiting examples of materials from which electrical energy storage cell protection layer 214 is formed include elastic materials that have a hardness of less than about 50 to 100 on a Shore scale and an electrical resistivity of greater than about 10 to about 20 ohms or more. In specific embodiments, the elastic material is a fluoropolymer rubber, butyl rubber, chlorosulfonated polyethylene rubber, epichlorohydrin rubber, ethylene propylene rubber, fluoroelastomer rubber, fluorosilicone rubber, hydrogenated nitrile rubber, natural rubber, nitrile rubber, perfluoroelastomer rubber, polyacrylic rubber, polychloroprene rubber, polyurethane rubber, silicone rubber and styrene butadiene rubber. In other specific embodiments, the elastic material is a low modulus, conformable foam, such as a thermoset closed-cell polyurethane foam or other closed cell thermoset polymer.

Electrical energy storage cell contact protection layer 214 also serves as a barrier or impediment to propagation of combustion from one side of electrical energy storage cell contact protection layer 214 to an opposite side of electrical energy storage cell contact protection layer 214. Electrical energy storage cell contact protection layer 214 serves as a barrier or impediment to propagation of combustion by providing a non-combustible impediment or fire block to flames resulting from combustion of gases emanating from a failed electrical energy storage cell within electrical energy storage cell module 200. In yet other embodiments, electrical energy storage cell contact protection layer 214 provides thermal insulation between electrical energy storage cell module 200 and electrical isolation layer 212. Such thermal insulation impedes and/or acts as a barrier to transfer of thermal energy from electrical energy storage cell module 200 to electrical isolation layer 212. Impeding thermal transfer between electrical energy storage cell module 200 and electrical isolation layer 212 shields adjacent electrical energy storage cells (not shown) of an adjacent electrical energy storage cell module (not shown) located above electrical energy storage cell module 200 from thermal energy that could result in failure of the electrical energy storage cells in the adjacent electrical energy storage cell module. For example, in the rare event that an electrical energy storage cell of electrical energy storage cell module 200 fails, the storage cell emits gases which upon combustion will generate large amounts of thermal energy. This thermal energy could cause other electrical energy storage cells to fail and potentially emit combustible gases. If these gases ignite a thermal run-away of the electrical energy storage cells could occur. Non-limiting examples of materials for use in electrical energy storage cell contact protection layer 214 have thermal conductivity values that are less than about 0.5 BTU/ft$^2$/hr/inch at temperatures corresponding to temperatures at which the electrical energy storage cells emit combustible gases and ignition of those gases occurs. According to some embodiments illustrated in FIGS. 7 and 8, electrical energy storage cell contact protection layer 214 is about 0.1 mm to 3.0 mm thick. In other embodiments, electrical energy storage cell contact protection layer 214 is about 0.5 mm to 2.0 mm thick, and in yet other embodiments, electrical energy storage cell contact protection layer 214 is about 0.75 mm to 1.25 mm thick. Electrical energy storage cell contact protection layer 214 may be thicker or thinner than the described non-limiting ranges, depending on, among other things, the amount of combustion migration inhibition, thermal insulation, electrical energy storage cell terminal protection and/or shock absorption desired.

Electrical isolation layer 212 is formed from an electrically nonconductive material, non-limiting examples of which include materials that are noncombustible at temperatures of about 130° C. and higher and exhibit dielectric constants which make them electrical insulators. In non-limiting embodiments, electrically nonconductive materials of the electrical isolation layer 212 prevent electrical isolation layer 212 from adversely affecting, e.g., short-circuiting, the terminals or conductive features electrically connected to the electrical energy storage cells. The electrically nonconductive materials of the electrical isolation layer 212 also electrically isolate terminals of electrical energy storage cells and electrical circuits making up electrical energy storage cell module 200 from combustion barrier layer 216. In yet other non-limiting embodiments, electrically nonconductive material making up electrical isolation layer 212 is noncombustible or flame retardant, thus allowing electrical isolation layer 212 to impede or prevent propagation of combustion from one side of electrical isolation layer 212 to an opposite side of electrical isolation layer 212. In other non-limiting embodiments, the electrically nonconductive material making up electrical isolation layer 212 provides thermal insulation between electrical energy storage cell contact protection layer 214 and combustion barrier layer 216. Such thermal insulation impedes and/or acts as a barrier to transfer of thermal energy from electrical energy storage cell module 200 via electrical energy storage cell contact protection layer 214 to electrical isolation layer 212. Impeding thermal transfer between electrical energy storage cell module 200 and combustion barrier layer 216 helps to protect adjacent electrical energy storage cell modules (not shown) from thermal energy that could result in failure of electrical energy storage cells in the adjacent electrical energy storage cell modules. For example, in the rare event an electrical energy storage cell of electrical energy storage cell module 200 fails and emits gases, which upon combustion will generate significant amounts of thermal energy, this thermal energy could cause other electrical energy storage cells in adjacent electrical energy storage cell modules to fail, rupture and self-ignite. Non-limiting examples of materials for use in electrical isolation layer 212 have thermal conductivity values that are less than about 3 BTU/ft$^2$/hr/inch, less than about 2 BTU/ft$^2$/hr/inch and less than about 1 BTU/ft$^2$/hr/inch at temperatures corresponding to temperatures where the electrical energy storage cells rupture and emit combustible gases which may ignite. In some embodiments, the electrically nonconductive material of the electrical isolation layer 212 is self-extinguishing.

The electrically nonconductive material may include ceramic materials, vermiculite-based materials or other materials known to be non-electrically conductive or a poor conductor of electricity and a good thermal insulator. The carrier for the ceramic materials may be paper-based, ceramic impregnated cloths, fiberglass or other materials capable of being formed into thin sheets. Non-limiting examples of electrically nonconductive materials include materials comprising ceramic fibers, such as a compressible fiber sheet made from a weave of silica and calcium oxide fibers held together with a noncombustible organic binder. Such ceramic fibers can be formed from alumina, mullite, silicon carbide, zirconia or carbon. In specific embodiments, the electrically nonconductive material includes silica/silica fibers, aluminum, Kevlar®, Nomex®, and calcium-magnesium-silicate fibers. Though not intending to be limited to such, some electrically nonconductive materials for use in electrical isolation layer 212 are fire resistant to 1260° C. or higher. According to non-limiting embodiments illustrated in FIGS. 7 and 8, the layer of electrically nonconductive material making up electrical isolation layer 212 has a thickness ranging from about 0.1 mm to about 3 mm. In other embodiments, electrical isolation layer 212 is about 0.25 mm to 2.0 mm thick, and in yet other embodiments, electrical isolation layer 212 is about 0.35 mm to 1.25 mm thick. Electrical isolation layer 212 may be thicker or thinner than the described non-limiting ranges, depending on, among other things, the amount of electrical isolation, combustion migration inhibition, and/or thermal insulation desired.

Combustion barrier layer 216 is a non-combustible, high strength material, non-limiting examples of which include materials that are noncombustible at temperatures of about 130° C. and higher and are able to withstand the types of forces imparted and conditions created by gases emanating from a failed electrical energy storage cell of electrical energy storage cell module 200. Failure of an electrical energy storage cell, e.g., due to structural damage and/or short-circuiting, can result in the rupture of the failed electrical energy storage cell as a result of pressure build up within the cell. Upon rupture, the gases within the electrical energy storage cell may escape at high velocities and combust. The noncombustible, high-strength material of combustion barrier layer 216 is selected from materials that can withstand the forces caused by these gases escaping the portable electrical energy storage device at high velocities and withstand the high temperatures associated with combustion of such gases. Combustion barrier layer 216 impedes and ideally prevents hot gases emanating from a failed electrical energy storage cell and/or flames resulting from combustion of such hot gases from impinging upon an adjacent electrical energy storage cell module above electrical energy storage cell module 200. Impeding and/or preventing gases and/or flames from impinging upon an adjacent electrical energy storage cell module reduces the likelihood that electrical energy storage cells in the adjacent electrical energy storage cell module will fail due to exposure to the temperatures produced when the gases from a failed electrical energy storage cell combust. In non-limiting embodiments, the noncombustible, high-strength material of combustion barrier layer 216 acts as an impediment or barrier to propagation of combustion from electrical energy storage cell module 200 to adjacent electrical energy storage cell modules. Non-limiting examples of materials for use as combustion barrier layer 216 include metals or metal alloys that can withstand temperatures of about 130° C. or higher without melting. In other non-limiting examples, materials for use as combustion barrier layer 216 include metals that do not melt at temperatures of about 500° C. or higher, 750° C. or higher, or even more than 1000° C. In other embodiments, the metals making up combustion barrier layer 216 do not melt after being exposed to temperatures of more than about 1000° C. for at least 10 seconds. In yet other embodiments, materials for use as combustion layer 216 include metals that do not melt after being exposed to temperatures of about 1400° C. for a period of at least 1 second. In specific non-limiting embodiments, combustion barrier layer 216 is formed from copper, a copper alloy, nickel, or a nickel alloy. While copper, copper alloy, nickel and nickel alloy have been described as exemplary metals from which combustion barrier layer 216 may be formed, combustion barrier layer 216 can be formed from other metals or non-metallic materials capable of impeding or preventing the gases and/or flames from combustion of the gasses from impinging upon an adjacent electrical energy storage cell module.

Located below electrical energy storage cell module 200 is a second electrical energy storage cell barrier 218. Electrical energy storage cell barrier 218 includes an electrical energy storage cell contact protection layer 220, electrical isolation layer 222 and a combustion barrier layer 224. The description with regard to electrical energy storage cell barrier 210 and its electrical energy storage cell contact protection layer 214, electrical isolation layer 212, and combustion barrier layer 216 applied equally to the electrical energy storage cell contact protection layer 220, electrical isolation layer 222 and combustion barrier layer 224 of electrical energy storage cell barrier 218. That description is not repeated in the interest of brevity. Second electrical energy storage cell barrier 218 differs in the orientation of its electrical energy storage cell contact protection layer 220, electrical isolation layer 222 and combustion barrier layer 224. These three layers of electrical energy storage cell barrier 218 are a mirror image of the same three layers of electrical energy storage cell barrier 210. In other words, moving away from electrical energy storage cell module 200 in FIG. 7 places electrical energy storage cell contact protection layer 220 closest to electrical energy storage cell module 200. Located below electrical energy storage cell contact protection layer 220 is electrical isolation layer 222 and below electrical isolation layer 222 is combustion barrier layer 216.

Figure 8:
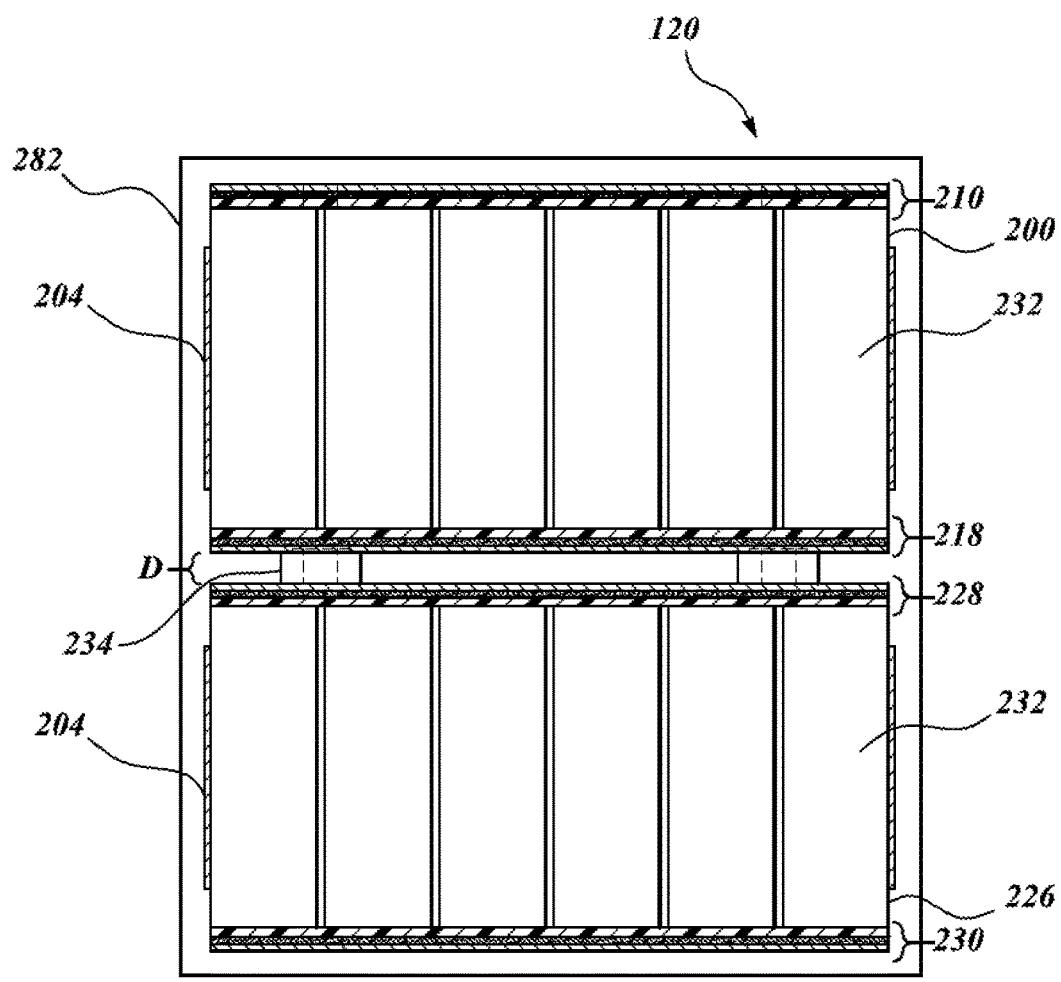
FIG. 8 is a side elevation view of a portable electrical energy storage device that includes two electrical energy storage cell modules of the type illustrated in FIG. 7.

Though not illustrated in FIG. 7, electrical energy storage device 120 as further illustrated in FIG. 8 includes at least one additional electrical energy storage cell module 226 located below electrical energy storage cell module 200 illustrated in FIG. 7. Both electrical energy storage cell module 200 and electrical energy storage cell module 226 include a plurality of electrical energy storage cells 232. In other embodiments, electrical energy storage device 120 may include more than two electrical energy storage cell modules. For example, electrical energy storage device 120 may include three or more electrical energy storage cell modules. In FIG. 8, electrical energy storage cell module 226 is sandwiched between electrical energy storage cell barrier 228 and electrical energy storage cell barrier 230. Electrical energy storage cell barrier 228 is identical to electrical energy storage cell barrier 210 and electrical energy storage cell barrier 230 is identical to electrical energy storage cell barrier 218. Accordingly, descriptions of electrical energy storage cell barrier 228 and electrical energy storage cell barrier 230 are omitted in the interest of brevity.

Referring to FIG. 8, electrical energy storage cell module 200 is spaced apart from electrical energy storage cell module 226 by a distance D. In non-limiting embodiments, distance D ranges from about 5 mm to about 20 mm, in other non-limiting embodiments, distance D ranges from about 7 mm to about 15 mm and in yet other embodiments, distance D ranges from about 8 mm to about 11 mm. In the illustrated embodiment of FIGS. 7 and 8, four spacers 234 are positioned between electrical energy storage cell module 200 and electrical energy storage cell module 226. Spacers 234 are cylindrical in shape and each includes a central bore. The central bore of each spacer 234 is in fluid communication with openings 236 through each of electrical energy storage cell contact protecting layers 214 and 220, electrical isolation layers 212 and 222 and combustion barrier layer 216 and 224. The combination of the central bore for spacers 234 and the openings 236 places the interior of electrical energy storage cell module 200 in fluid communication with the interior of electrical energy storage cell module 226. This fluid communication allows pressure within electrical energy storage cell modules 200 and 226 to equalize.

In specific embodiments of the subject matter described herein, interior surface 205 of module sidewall 204 carries a fireproof or fire-resistant material, such as an intumescent paint. Alternatively, such fireproof or fire-resistant material may be carried by the exterior outer wall 202 of electrical energy storage cell module 200 between the exterior surface of such module and the interior surface of module sidewall 204. Providing such a fireproof/fire-resistant material impedes migration of flames on the exterior of module sidewall 204 into the interior of electrical energy storage cell module 200.

Referring to FIG. 7, electrical isolation layer 212 includes a plurality of biased vents 238. Combustion barrier layer 216 includes a plurality of biased vents 240. Electrical isolation layer 222 includes a plurality of biased vents 242 and combustion barrier layer 224 includes a plurality of biased vents 244. Biased vents 238, 240, 242 and 244 are essentially identical. In embodiments described with reference to FIG. 7, biased vents 238 and 240 open in an upward direction while biased vents 242 and 244 open in a downward direction. Biased vents 238, 240, 242 and 244 are essentially aligned with individual electrical energy storage cells 232 making up electrical energy storage cell module 200.

Figures 9, 10:
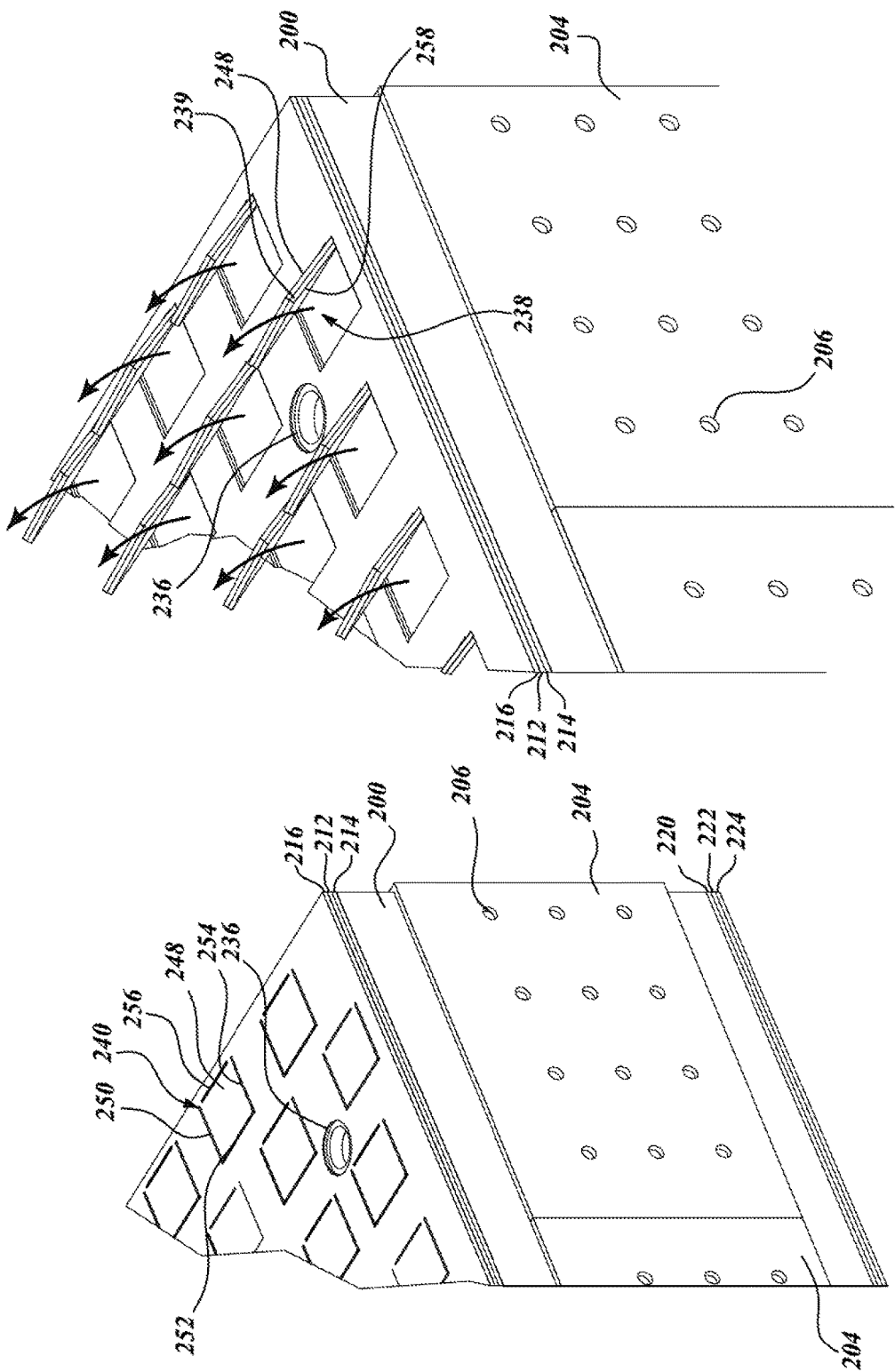
FIG. 9 is an isometric view of a portion of an electrical energy storage cell module with biased vents in a closed position, according to a non-limiting embodiment.
FIG. 10 is an isometric view of the electrical energy storage cell module of FIG. 9 showing the biased vents in an open position.

The following description of biased vents 240 applies equally to biased vents 238. Referring additionally to FIGS. 9 and 10, biased vents 240 include at least one flap 248 formed in combustion barrier layer 216. In the exemplary embodiment of FIGS. 9 and 10, flap 248 has a square shape. Flap 248 is defined by a plurality of scored portions 250, 252 and 254 which pass through combustion barrier layer 216. Scored portions 250, 252 and 254 can be formed using cutting devices suitable for cutting metal such as blades, stamps, lasers, and the like. Scored portions 250, 252 and 254 defined three sides of square flap 248. The remaining side is defined by a hinge portion 256. Hinge portion 256 does not pass completely through combustion barrier layer 216 and serves as a hinge-like structure along which flap 248 bends so flap 248 can move from a closed position shown in FIG. 9 to an open position as illustrated in FIG. 10. Hinge portion 256 can be formed using devices capable of compressing combustion barrier layer 216 at the location of hinge portion 256. While hinge portion 256 is illustrated and described as a crimped structure, embodiments described herein are not limited to a hinge portion 256 that is crimped and include other structures that can function as a hinge for flap 248. For example, hinge portion 256 can be provided by perforations or other structure that facilitates folding or bending of combustion barrier layer 216 along hinge portion 256. Hinge portion 256 of flap 248 can be designed so that when a predetermined threshold pressure is exerted on flap 248, biased vent 238 bends along its hinge portion and opens in the manner illustrated in FIG. 10.

In addition to biased vents 240 provided in combustion barrier layer 216, similar biased vents 238 are provided in electrical isolation layer 212. In the exemplary embodiments illustrated in FIGS. 7, 9 and 10, biased vents 240 and biased vents 238 are substantially identical; however, embodiments described herein are not limited to portable electrical energy storage devices that include biased vents 240 and biased vents 238 that are substantially identical. Referring to FIG. 10, biased vents 238 provided in electrical isolation layer 212 are formed by three scored portions and a hinge portion. In the illustrated embodiments, the three scored portions of biased vents 238 underlie the scored portions 250, 252 and 254 of biased vents 240, the hinge portion of biased vents 238 underlie the hinge portion 256 of biased vents 240 and flap 239 of biased vent 238 underlies flap 248. In other embodiments, a scored portion of biased vents 238 underlies hinge portion 256 of biased vents 240. In certain embodiments, the peripheral dimensions of flap 239 may be slightly less than the peripheral dimensions of flap 248. This difference in peripheral dimensions between flap 239 and flap 248 allows flap 239 to pass through the opening in combustion barrier layer 216 when flap 248 is open. Conversely, the smaller peripheral dimensions of flap 239 compared to flap 248 impedes passing of flap 248 through the opening of biased vent 238. In addition, the hinge portion of biased vents 238 maybe laterally offset slightly from hinge portions 256 of biased vents 240 to promote freer opening of biased vent 238 through the opening in combustion barrier layer 216.

The underside 258 of flap 239 of biased vents 238 contacts the upper surface of electrical energy storage cell contact protection layer 214. This contact impedes movement of flap 239 in a downward direction in FIGS. 9 and 10 which in turn impedes movement of flap 248 in a downward direction. In contrast, flaps 239 and flaps 248 are able to move in an upward direction as illustrated in FIG. 10. Thusly, biased vents 238 and biased vents 240 are "one-way" vents capable of opening in a direction away from electrical energy storage cell module 200, but not in a direction toward electrical energy storage cell module 200. Biased vents 238 and 240 are biased to a closed position illustrated in FIG. 9, however, a buildup of pressure within electrical energy storage cell module 200, or the force of gases emitted from a failed electrical energy storage cell, can provide a driving force causing flaps 239 and 248 to bend along their respective hinge portions and open in an upward direction. In addition to allowing gas within electrical energy storage cell module 200 to escape, the one-way characteristic of the biased vents also impedes or prevents gases that may impinge on the biased vents from coming in direct contact with an electrical energy storage cell making up an electrical energy storage cell module that is on a side of the biased vents opposite from the side upon which the gases impinge. Because the biased vents open outward, and not inward, from an electrical energy storage cell module, the biased vents allow exhaust of gases and thermal energy emanating from a failed electrical energy storage cell in the electrical energy storage cell module and prevent gases and thermal energy impinging upon biased vents of an adjacent electrical energy storage cell module from coming in direct contact with electrical energy storage cells of the adjacent electrical energy storage cell module.

Electrical isolation layer 222 includes a plurality of biased vents 242 and combustion barrier layer 224 includes a plurality of biased vents 244. The description above of biased vents 238 and biased vents 240 and the features making up biased vents 238 and 240 applies equally to biased vents 242 and biased vents 244, respectively, with the exception that biased vents 242 and 244 open in a downward direction with reference to the non-limiting embodiment illustrated in FIG. 7.

Figure 12:
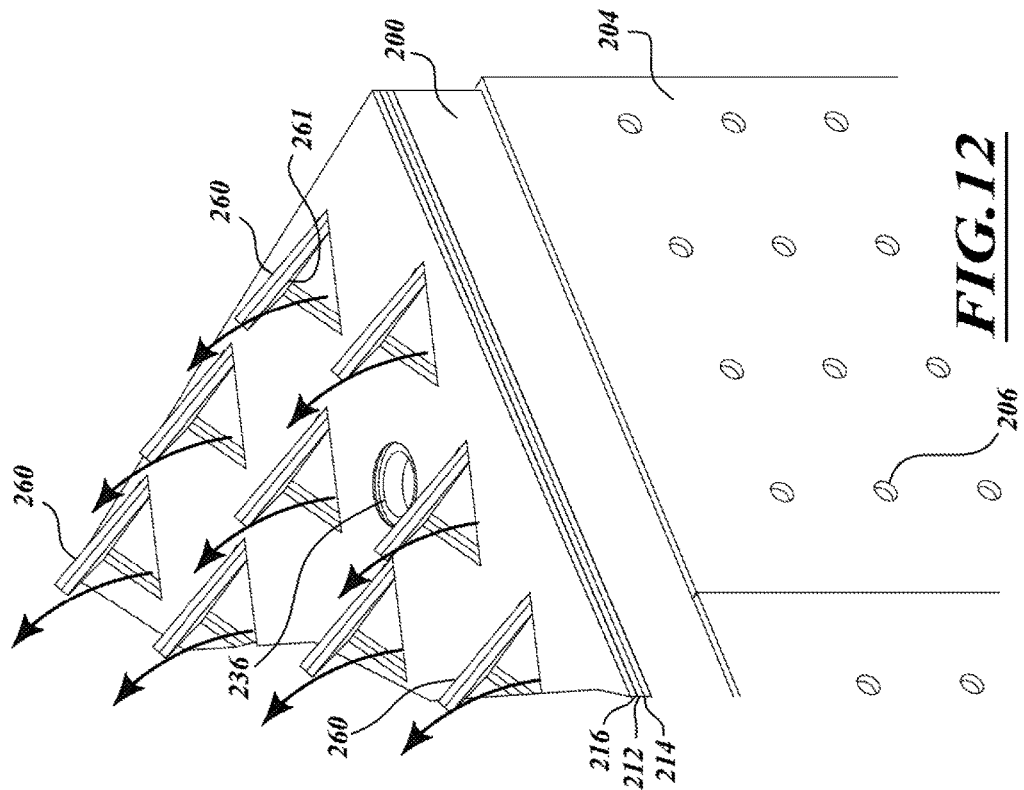
FIG. 12 is an isometric view of the electrical energy storage cell module of FIG. 11 showing the biased vents in an open position.
Figure 11:
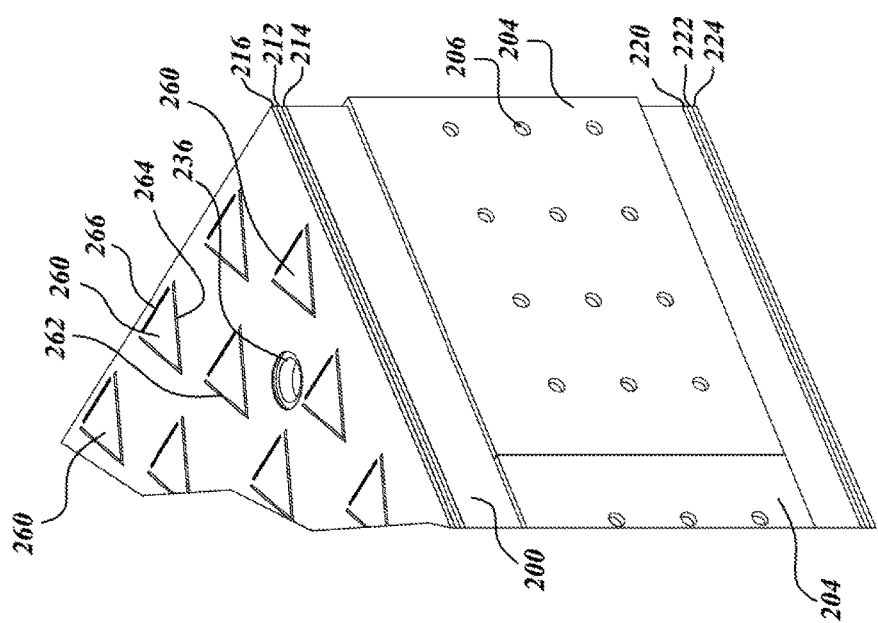
FIG. 11 is an isometric view of a portion of an electrical energy storage cell module with biased vents in a closed position, according to a non-limiting embodiment.

Referring to FIGS. 11 and 12, other embodiments of shapes for biased vents 238, 240, 242 and 244 are illustrated. The biased vents in FIGS. 11 and 12 have a periphery in the shape of a triangle. The biased vents in combustion barrier layer 216 include a flap 260 that is defined by two scored portions 262 and 264 and a hinge portion 266. Electrical isolation layer 212 includes biased vents that include flaps 261 similar to flaps 260 of the biased vents in combustion barrier layer 216. The descriptions above regarding biased vents 238, 240, 242 and 244, flaps 239 and 248, scored portions 250, 252 and 254 and hinge portion 256 apply equally to flaps 260 and 261, scored portions 262 and 264 and hinge portion 266 of the biased vents in combustion barrier layer 16 and electrical isolation layer 212 illustrated in FIGS. 11 and 12.

Referring to FIGS. 13 and 14, other embodiments of shapes for biased vents 238, 240, 242 and 244 are illustrated.

Each biased vent of FIGS. 13 and 14 comprises four flaps 268, 270, 272 and 274 each having a periphery in the shape of a triangle. Each flap 268, 270, 272 and 274 is defined by a pair of perpendicular crossing scored portions 276 and 278 and a hinge portion 280. The descriptions above regarding biased vents 238 and 240, flaps 239 and 248, scored portions 250, 252 and 254 and hinge portion 256 apply equally to the biased vents in combustion layer 216 and electrical isolation layer 212 of FIGS. 13 and 14 and their respective flaps, scored portions and hinge portions.

Referring to FIG. 8, when pressure within second electrical energy storage cell module 226 exceeds the pressure at which biased vents 238 and 240 (in FIG. 7) open, biased vents 238 and 240 open allowing gas to escape through the biased vents. Allowing the gas to escape second electrical energy storage cell module 226 reduces the risk that module 226 will burst. The escaping gas may follow a path similar to dotted line 106 in FIG. 6. The gas and thermal energy escaping from second electrical energy storage cell module 226 impinges upon the underside of first electrical energy storage cell module 200 where it is dissipated along the underside of first electrical energy storage cell module 200, finding its way to the periphery of first electrical energy storage cell module 200 and the space between first electrical energy storage cell module 200 and shell 282. As the gas and thermal energy passes through the space between first electrical energy storage cell module 200 and shell 282, it dissipates the thermal energy of the gas or combusting gas. In FIG. 8, second electrical energy storage cell module 226 is spaced apart from first electrical energy storage cell module 200 by a distance D. Spacing of second electrical energy storage cell module 226 from first electrical energy storage cell module 200 by the distance D promotes dissipation of the gases and thermal energy emanating from second electrical energy storage cell module 226 by allowing the gas and thermal energy to spread out laterally across a larger surface area. Promoting the dissipation of the thermal energy of the gases emanating from the second electrical energy storage module over a larger surface area reduces the magnitude of thermal energy focused on a small area of electrical energy storage cell module 200, thereby reducing the likelihood that such focused thermal energy will cause failure or explosion of an electrical energy storage cell 232 in first electrical energy storage cell module 200. Opening of biased vents 238 and 240 reduces the likelihood that gases and thermal energy emanating from a failed electrical energy storage cell 232 in second electrical energy storage cell module 226 will be directed internally within second electrical energy storage cell module 226, e.g., along dotted line 102 in FIG. 6.

As gas and thermal energy flows between first electrical energy storage cell module 200 and shell 282, first electrical energy storage cell module 200 is at least fully or partially separated from the gases and thermal energy by module sidewalls 204. Pressure differentials across module sidewalls 204 are mitigated by vents 206 in module sidewalls 204. Vents 206 also facilitate equalization of pressure within the portable electrical energy storage device 120 by allowing pressure on one side of module sidewalls 204 to equilibrate with pressure on the other side of module sidewalls 204. Equalization of pressure within the portable electrical energy storage device 120 is also promoted by openings 236 in electrical energy storage cell barrier 210 and electrical energy storage cell barrier 218. Openings 236 permit gases within second electrical energy storage cell module 200 to pass through electrical energy storage cell barrier 210 or electrical energy storage cell barrier 218 into the interior space of portable electrical energy storage device 120 or into adjacent electrical energy storage cell module 226. Passing of gas through electrical energy storage cell barrier 210 and electrical energy storage cell barrier 218 serves to equalize pressure within electrical energy storage cell module 200 and the pressure outside electrical energy storage cell module 200 within shell 282 or the pressure within electrical energy storage cell module 226. In certain embodiments, tubes or pipe may extend between openings 236 located above an energy storage cell module and openings 236 located below the electrical energy storage cell module.

While the operation and advantages of biased vents in accordance with nonlimiting embodiments described herein have been described with reference to the biased vents in electrical energy storage cell barrier 210, the same operation and advantages are provided by biased vents 242 and 244 and electrical energy storage cell barrier 218. Although only two electrical energy storage cell modules 200 and 226 are illustrated in the nonlimiting embodiments of FIGS. 6 and 8, portable electrical energy storage devices in accordance with embodiments described herein include those that contain more than two electrical energy storage cell modules of the type described herein.

The foregoing detailed description has set forth various embodiments of the devices via the use of schematic illustrations and examples. Insofar as such schematics and examples contain one or more functions and/or operations, it will be understood by those skilled in the art that each function and/or operation within such structures and examples can be implemented, individually and/or collectively, by a wide range of hardware and combinations thereof. The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

While generally discussed in the environment and context of power systems for use with personal transportation vehicles such as all-electric scooters and/or motorbikes, the teachings herein can be applied in a wide variety of other environments, including other vehicular as well as non-vehicular environments. Further, while illustrated with reference to specific shapes and orientations, the illustrations and descriptions are not intended to be exhaustive or to limit the embodiments to the precise forms illustrated. For example, electrical energy storage cells need not be round cylinders, but could take different shapes such as square cylinders, square boxes or rectangular boxes. Similarly, embodiments utilizing multiple electrical energy storage cell modules have been illustrated and described with reference to the modules being stacked one above the other; however, such descriptions are not intended to be exhaustive or to limit the embodiments described herein to such precise configurations. For example, electrical energy storage cell modules may be placed side by side and separated by the electrical energy storage cell barriers including layers of thermal insulating material and layers of elastic material. In addition, electrical energy storage cell barriers have been illustrated and described with reference to a combination of a layer of elastic material and a layer of thermal insulating material, as well as a layer of thermal insulating material sandwiched between two layers of elastic material. Again, these illustrations and descriptions are not intended to be exhaustive or to limit the embodiments to the precise forms illustrated. For example, electrical energy storage cell barriers may include more than the illustrated and specifically described number of layers of thermal insulating material and layers of elastic material.

The above description of illustrated embodiments, including what is described in the Abstract, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A portable electrical energy storage device, comprising:
   a housing including a sidewall;
   a first electrical energy storage cell module including a plurality of first electrical energy storage cells that is located within the housing;
   a first cell module sidewall positioned adjacent the first electrical energy storage cell module that includes a plurality of first openings aligning with first void space between the plurality of first electrical energy storage cells;
   a second electrical energy storage cell module including a plurality of second electrical energy storage cells that is located within the housing and adjacent the first electrical energy storage cell module;
   a second cell module sidewall positioned adjacent the second electrical energy storage cell module that includes a plurality of second openings aligning with second void space between the plurality of second electrical energy storage cells;
   a first electrical energy storage cell barrier located between the first electrical energy storage cell module and the second electrical energy storage cell module, wherein the first electrical energy storage cell barrier includes a plurality of first biased vents configured to operably open in an upward direction; and
   a second electrical energy storage cell barrier located on a side of the second electrical energy storage cell module opposite to the first electrical energy storage cell barrier, wherein the second electrical energy storage cell barrier includes a plurality of second biased vents configured to operably open in a downward direction, and wherein the plurality of first biased vents are essentially aligned with the plurality of second biased vents.

2. The portable electrical energy storage device of claim 1, wherein the first electrical energy storage cell barrier is spaced apart from the second electrical energy storage cell barrier.

3. The portable electrical energy storage device of claim 1, further comprising at least one spacer between the first electrical energy storage cell barrier and the second electrical energy storage cell module.

4. The portable electrical energy storage device of claim 1, wherein the first electrical energy storage cell barrier and the second electrical energy storage cell module are spaced apart at least 2 mm.

5. The portable electrical energy storage device of claim 4, wherein the first electrical energy storage cell barrier and the second electrical energy storage cell module are spaced apart at least 5 mm.

6. The portable electrical energy storage device of claim 5, wherein the first electrical energy storage cell barrier and the second electrical energy storage cell module are spaced apart at least 8 mm.

7. The portable electrical energy storage device of claim 1, wherein the first electrical energy storage cell barrier and the second electrical energy storage cell module are spaced apart about 5 mm to about 15 mm.

8. The portable electrical energy storage device of claim 1, wherein the first electrical energy storage cell barrier includes an electrical isolation layer of a dielectric material sandwiched between an electrical energy storage cell contact protection layer of an elastic material and a combustion barrier layer of a non-combustible material, and wherein the electrical isolation layer contacts the electrical energy storage cell contact protection layer.

9. The portable electrical energy storage device of claim 1, wherein the second electrical energy storage cell barrier includes an electrical isolation layer of a dielectric material sandwiched between an electrical energy storage cell contact protection layer of an elastic material and a combustion barrier layer of a non-combustible material, and wherein the electrical isolation layer contacts the electrical energy storage cell contact protection layer.

10. The portable electrical energy storage device of claim 1, wherein the first cell module sidewall includes an inner side facing the plurality of first electrical energy storage cells and an outer side facing the sidewall of the housing, and wherein the plurality of first openings enable fluid to pass from the inner side to the outer side.

11. The portable electrical energy storage device of claim 1, further comprising a fire retardant material between the first cell module sidewall and the plurality of first electrical energy storage cells.

12. The portable electrical energy storage device of claim 1, wherein the second electrical energy storage cell module is below the first electrical energy storage cell module.

13. The portable electrical energy storage device of claim 1, wherein each of the plurality of first electrical energy storage cells includes a load member having an annular load member body and center tab suspended from the annular load member body.

14. The portable electrical energy storage device of claim 13, wherein the center tab is suspended from the annular load member body by a cantilevered arm.

15. A portable electrical energy storage device, comprising:
   a housing including a sidewall;
   a first electrical energy storage cell module including a plurality of first electrical energy storage cells that is located within the housing;
   a first cell module sidewall positioned adjacent the first electrical energy storage cell module that includes a plurality of first openings aligning with first void space between the plurality of first electrical energy storage cells;
   a second electrical energy storage cell module including a plurality of second electrical energy storage cells that is located within the housing and adjacent the first electrical energy storage cell module;

a second cell module sidewall positioned adjacent the second electrical energy storage cell module that includes a plurality of second openings aligning with second void space between the plurality of second electrical energy storage cells;

a first electrical energy storage cell barrier comprising a layer of a dielectric material sandwiched between a layer of an elastic material and a layer of a non-combustible material, the first electrical energy storage cell barrier being located between the first electrical energy storage cell module and the second electrical energy storage cell module, the layer of dielectric material and the layer of the non-combustible material including a plurality of first biased vents configured to operably open in an upward direction; and a second electrical energy storage cell barrier located on a side of the second electrical energy storage cell module opposite to the first electrical energy storage cell barrier, wherein the second electrical energy storage cell barrier includes a plurality of second biased vents configured to operably open in a downward direction, and wherein the plurality of first biased vents are essentially aligned with the plurality of second biased vents.

16. The portable electrical energy storage device of claim 15, wherein each of the plurality of first electrical energy storage cells includes a load member having an annular load member body and a center tab suspended from the annular load member body.

17. The portable electrical energy storage device of claim 16, wherein the center tab is suspended from the annular load member body by a cantilevered arm.

* * * * *